(12) United States Patent
Fireaizen et al.

(10) Patent No.: US 10,107,892 B2
(45) Date of Patent: Oct. 23, 2018

(54) SYSTEMS AND METHOD FOR LOCATING A SIGNAL SOURCE

(71) Applicant: Elta Systems Ltd., Ashdod (IL)

(72) Inventors: Moshe Fireaizen, Halamish (IL); Aharon Razon, Tel-Aviv (IL)

(73) Assignee: ELTA SYSTEMS LTD., Ashdod (IL)

( * ) Notice: Subject to any disclaimer, the term of this patent is extended or adjusted under 35 U.S.C. 154(b) by 287 days.

(21) Appl. No.: 15/208,264

(22) Filed: Jul. 12, 2016

(65) Prior Publication Data
US 2017/0030996 A1 Feb. 2, 2017

(30) Foreign Application Priority Data
Aug. 2, 2015 (IL) .......................................... 240281

(51) Int. Cl.
| | | |
|---|---|---|
| *G01S 5/06* | (2006.01) | |
| *G01S 5/02* | (2010.01) | |
| *H04W 56/00* | (2009.01) | |
| *H04W 64/00* | (2009.01) | |

(52) U.S. Cl.
CPC .................. *G01S 5/06* (2013.01); *G01S 5/02* (2013.01); *G01S 5/0221* (2013.01); *G01S 5/0268* (2013.01); *H04W 56/001* (2013.01); *H04W 64/003* (2013.01)

(58) Field of Classification Search
CPC . G01S 5/06; G01S 5/02; G01S 5/0221; G01S 5/0268; G01S 5/04; G01S 5/021; H04W 56/001; H04W 64/003

USPC .......................................................... 342/465
See application file for complete search history.

(56) References Cited

U.S. PATENT DOCUMENTS

2014/0300516 A1 10/2014 Min et al.

OTHER PUBLICATIONS

European Search Report for European Application No. 16179029.0 dated Dec. 20, 2016.

*Primary Examiner* — Harry K Liu
(74) *Attorney, Agent, or Firm* — Dorsey & Whitney LLP

(57) ABSTRACT

A method utilizes signals received from the signal source by receivers during respective time intervals and data about a change in positions of the receivers during these time intervals. The method includes applying first processing to each of the signals received by each respective receiver to determine an accumulated phase in the signal during a respective time interval. Applying second processing to determine differential phases differences between the accumulated phases of the signals received by two or more pairs of the receivers. The phases differences are indicative of the difference between the changes of the distances of the respective receivers from the signal source during the respective time intervals. The method includes applying a third processing for determining the location of the signal source such that the relative changes between the positions of the respective receivers relative to the determined location correspond to the distance differences of the phase differences.

20 Claims, 8 Drawing Sheets

100

- 105 — Providing a number of at least two receivers {$Rc_n$}, including one or more receivers mounted on moving platforms.

- 110 — Providing data indicative of a signal $S_n$ received by each of the at least two receiver {$Rc_n$}.

- 120 — Applying first processing to each received signal $S_n$ to determine the phase $\Delta\theta_n$ that is accumulated during certain time interval $\Delta t$ of the reception of the signal $S_n$
  - 122 - Inter-pulse phase accumulation
  - 124 - Intra-pulse phase accumulation

- 130 — Applying a second processing to determine a differential phase $\Delta\Delta\theta_{mn} = (\Delta\theta_m - \Delta\theta_n)$ between the accumulated phases, $\Delta\theta_m$ and $\Delta\theta_n$, of the signals, $S_m$ and $S_n$, received by one or more pairs {m,n} of the receivers $Rc_m$ and $Rc_n$.

- 140 — Providing position data indicative of positions of the at least two receivers

- 150 — Applying a third processing to determine the location of the signal source based on the differential phase $\Delta\Delta\theta_{mn}$ between the accumulated phases, $\Delta\theta_m$ and $\Delta\theta_n$, of the pairs {m,n} of receivers and their respective positions.

- 160 — Optionally further utilizing *multilateration* (i.e. differential time of arrival technique) in said third processing to thereby enable determination of the location of the signal source with reduced number of receivers

- 162 — Providing the signal S from the signal source SRC as a modulated signal including one or more modulation patterns (e.g. pulses) $\{P_j\}$

- 164 — Recording the times of arrival $\{\tau_n\}$ of at least one pulse $P_j$ at two or more of the receivers $\{Rc_n\}$

- 165 — Obtaining sync data indicative of time synchronization of the receivers, and synchronizing the times of arrival $\{\tau_n\}$

- 166 — Determining the differential time of arrival $\Delta\tau_{mn} = \Delta\tau_m - \Delta\tau_n$ of the pulse $P_j$ to the receivers

- 168 — Optionally, determining the location of the signal source Src (in operation 150 of method 100) by utilizing the differential times of arrival $\Delta\tau_{mn}^j = \Delta\tau_m^j - \Delta\tau_n^j$ of the pulse $PL^j$ to the receivers $Rc_m$ and $Rc_n$ in addition to the differential phases $\Delta\theta_{mn}$ between pairs of the receivers $Rc_m$ and $Rc_n$, thereby providing for reducing the number of receivers required to locate the signal source.

- 169 — Optionally, utilizing the differential times of arrival $\Delta\tau_{mn}^i$ and $\Delta\tau_{mn}^j$ of two or more pulses $PL^i$ and $PL^j$ to resolve ambiguities which may arise in determination of the differential phases $\Delta\Delta\theta_{mn}$ in the second processing (operation 130 of method 100).

Fig. 2B

SYSTEMS AND METHOD FOR LOCATING A SIGNAL SOURCE

TECHNOLOGICAL FIELD

Embodiments of the invention are in the field of signal processing and relates to techniques for locating a source of a signal by a plurality of receivers.

BACKGROUND

Various techniques are known in the art for determining the location of a signal source by receiving and processing the signal emitted from the source by a plurality of signal receivers.

For example, one such technique, known as Frequency Difference of Arrival (FDOA), also known as Differential Doppler (DD), provides for estimating the location of a radio signal emitter based on observations/receipt of the signal from other points/receivers. In the FDOA technique the receivers must be in relative motion with respect to the signal emitter. For example, in geolocation applications, the relative motion is sometimes achieved by using airborne receivers on an aircraft. This relative motion between the receivers results in different Doppler shifts in the signals that are received by the receivers. The location of the signal source is then estimated based on the locations and velocities of the receivers and the Doppler shifts in the signals received by the receivers.

A known disadvantage of the FDOA technique is that large amounts of data must be moved between receivers to a central location (processing center) to carry out the cross-correlation that is necessary to estimate the Doppler shift. The accuracy of the location estimate is related to the signal-to-noise ratio at each receiver point, and the geometry and vector velocities of the receivers points. Also, it is difficult to measure frequency of pulse-type signals to the level of accuracy needed to carry out the FDOA technique, because the frequency resolution is equal to 1/T, where T is the pulse duration.

Time Difference of Arrival (TDOA, also known as multilateration) is another known technique for determining the location of a signal source by a plurality of signal receivers. TDOA takes advantage of the fact that a transmitted signal will arrive at different times to receivers at different locations. According to this technique, a number of spatially separated receivers capture the emitted signal, and the time differences of the arrival (TDOAs) of the signal to the receivers are determined. The emitter's location is calculated by using the TDOAs and the location of the receivers.

When using the TDOA technique, the receivers and the emitter may be stationary, however the signal emitted from the emitter should generally be modulated (e.g., pulsed) to thereby enable identifying and measuring the time of arrival (TOA) of the modulation pattern to the different receivers, and determining the DTOAs of the modulation pattern in between different receivers. To this end, the TDOA technique requires that the two or more geographically separated receivers will be time synchronized with each other, in order to allow precise measurement of the TDOAs providing for determining the location of the emitter.

GENERAL DESCRIPTION

There is a need in the art for a novel technique for locating signal sources by utilizing a plurality of signal receivers. Conventional techniques, such as FDOA and TDOA indicated above, for locating a source of a signal detected by the plurality of receivers, are associated with various deficiencies which limit their use in various scenarios.

TDOA generally requires that the signal from the signal source is modulated/pulsed so that the time of arrival (TOAs) of the modulation/pulse can be identified at each of the receivers. Additionally, TDOA also requires that the receivers be time-synchronized so that TOAs of the modulation/pulses to each of them will be synced allowing to correctly determine the differential time of arrival of the modulation/pulses between the receivers.

Regarding FDOA, this technique requires transmission of large volumes of data from a plurality of respectively moving receivers to a central location (e.g., processing center), and also involves highly intensive computation of such data. For example, the FDOA technique utilizes measurement of the relative Doppler shifts between the signals received by a plurality of receivers, and requires that the receivers are moving at known velocities. According to this technique, data indicative of the signal received and sampled by each of the receivers is communicated to a processing center, at which the signals from the plurality of receivers are correlated to determine the relative Doppler shifts between them. Then, based on the relative Doppler shifts determined in this way and the known velocities of the receivers, the location of the signal source is estimated. However, conventionally, in order to achieve good accuracy, the above procedure is performed a plurality of time frames (e.g., in a plurality of time frames which may extend for relatively long total time durations, in the order of seconds). To this end, in the FDOA technique, a high volume of data is communicated from the receivers to the processing center and computationally intensive calculations are performed at the control center to correlate the signals received from the different receivers at each time frame to determine their relative Doppler shifts.

Embodiments of the present invention provide a novel technique, referred to in the following as differential phase technique, for locating of a signal source by detecting the signal from the signal source by a plurality of receivers, and processing the received signals to determine the differential phase that is the difference between the accumulated phases of the signals that are received by the different receivers, and accumulated over a certain time duration/interval (which may be, for example, in the order of seconds). Then, based on information indicative of the respective positions of the receivers at two time points (e.g., at the beginning and the end of the time interval), and the differences between the accumulated phases of the signals received by different receivers (i.e. based on the differential phase), the location of the signal source is accurately determined.

More specifically, Embodiments of the present invention rely on the understanding that the accumulated phase in a signal received by a receiver during a certain interval is a function of the duration of the time interval and the change in the distance between the receiver and the signal source during that time interval. By utilizing the accumulated phases of several receivers, differences between the changes of the respective distances between the receivers and the signal source may be determined, allowing estimating the location of the signal source.

As will be further described below, the technique according to one or more embodiments of the invention may be performed in conjunction with the TDOA technique to reduce the number of receivers required, and/or improve the accuracy of the location of the signal source, and/or resolve possible ambiguities in the location of the signal source.

According to the technique according to one or more embodiments of the invention, instead of monitoring the relative Doppler shifts between the signals received by different moving receivers as done in FDOA, and instead of, or in addition to, determining the different times of arrival of a pulse to the receivers as done in TDOA, the technique according to one or more embodiments of the invention monitors the accumulated phases of the signals received at each of the receivers.

As will be further described below, unwrapping/monitoring the accumulated phases of the received signals may be performed locally at each of the receivers, or at the processing center, or performed partially at the receivers and partially at the processing center.

For instance, determining the inter-pulse accumulated phase (which is the accumulated phase of each pulse of the signal that is received by a receiver) may be performed locally at the receiving receiver and may involve simple and lightweight inter-pulse unwrapping processing, which can be incorporated by suitable hardware/software at the receivers. It should be noted that communicating the inter-pulse accumulated phases that are accumulated at a certain time interval at the receivers involves communication of only small amounts of data (e.g., as compared to techniques such as FDOA where data indicative of practically the entire number of received signals is transmitted), thus does not require large data communication bandwidths and/or time. Then, at the processing center, the intra-pulse accumulated phase (which is the accumulated phase in between two or more successive pulses of the signal that were received by the receiver) may be determined, unambiguously, at the processing center, by carrying out an intra-pulse unwrapping processing in conjunction with the inter-pulse accumulated phases that are obtained from the different receivers.

Optionally, in cases where the signal source is a CW emitter, or otherwise not a pulsed emitter, the phases of the signal received from the emitter may be accumulated for extended time durations/intervals (in the order of seconds) so as to provide desired accuracy of location of the signal source. This may be done at the receivers, at the processing center, or by a combination of both, by using the same inter-pulse unwrapping processing indicated above. To this end, accumulating the phases for time intervals of several seconds may provide accuracy equivalent to, or better than, that achievable by carrying out a plurality of sessions for locating the signal source based on the FDOA technique, yet with much reduced signal processing and data communication requirements as compared to the FDOA technique.

In this regard, it should be noted that according to the technique of one or more embodiments of the present invention, the time intervals, during which the phases are accumulated at the different receivers, are not necessarily synchronized and may pertain to different times. This is advantageous over the TDOA technique which requires that the receivers are time synchronized. In this regard, it should be noted that the time intervals, during which the phases of the signals received by the different receivers are accumulated, should be of equal duration in order to resolve possible ambiguities in the estimation of the accumulated phases (e.g., in the intra-pulse accumulated phases). More specifically, this refers to cancelling out the term $2\pi \cdot f \cdot dt$ in the accumulated phases, where f is the signal's frequency and dt is the time interval.

According to the differential phase technique of one or more embodiments of the invention, after the accumulated phases at the different receivers are determined/estimated (e.g., at the receivers and/or in the processing center), they are then further processed by the processing center to determine the location of the signal source. More specifically, the location of the signal source is determined based on the difference between the phases accumulated at the different receivers and the positions of the receivers at the initial and final times of the time intervals during which phase accumulation (unwrapping) was performed. The processing for determining the location of the signal source involves a relatively lightweight computation, which does not require computationally intensive and data consuming processing (as opposed to other known in the art techniques such as FDOA which involves correlating the signals received by the plurality of receivers).

It should also be noted that the technique of one or more embodiments of the present invention obviates a need to monitor the trajectories of the signal receivers and their velocities along the trajectory, as would be required by techniques such as FDOA and that only data indicative of the positions of the receivers at two time points (e.g., at the beginning and the end of the time interval during which the phase is accumulated) is required to determine the location of the signal source.

Thus according to a broad aspect of one or more embodiments of the present invention there is provided a method for locating a signal source. The method includes:

providing measured data indicative of a signal $S_n$ received from a signal source by each of a number of at least two receivers $\{Rc_n\}$ during time intervals $\{\Delta t_n\}$ (e.g., of equal durations), where n is an index indicating the $n^{th}$ receiver $Rc_n$;

providing position data indicative of positions $\{R_n\}$ of the at least two receivers and of change $\{\Delta R_n\}$ in said positions $\{R_n\}$ during said time intervals $\{\Delta \Delta t_n\}$ respectively; (the data about the change $\{\Delta R_n\}$ in said positions $\{R_n\}$ during said time intervals $\{\Delta t_n\}$ of a receiver $Rc_n$ may for example include data indicative of positions of the receiver at two or more times within the respective time intervals $\{\Delta t_n\}$).

applying first processing to each of the signal $S_n$ to determine an accumulated phase $\Delta \theta_n$ that is accumulated during the time interval $\Delta t_n$ during which the signal $S_n$ is received by the respective receiver $Rc_n$ and thereby determining accumulated phases $\{\Delta \theta_n\}$ of signals $\{S_n\}$ received by said receivers $\{Rc_n\}$ respectively from the signal source;

applying second processing to determine differential phase differences $\Delta\Delta\theta_{mn} = (\Delta\theta_m - \Delta\theta_n)$ between the accumulated phases, $\Delta\theta_m$ and $\Delta\theta_n$, of the signals, $S_m$ and $S_n$, received by two or more pairs $\{m,n\}$ of the receivers, $Rc_m$ and $Rc_n$. According to the technique of one or more embodiments of the invention, the differential phase difference $\Delta\Delta\theta_{mn}$, between a pair of the receivers $Rc_m$ and $Rc_n$, is indicative of a distance difference $\Delta D_{mn}$ between the changes, $\Delta d_m$ and $\Delta d_n$, in the distances, $d_m$ and $d_n$, of the respective receivers $Rc_m$ and $Rc_n$ from said signal source during the time intervals $\Delta t_m$ and $\Delta t_n$ respectively; and applying a third processing to determine a location of said signal source based on the position data and the differential phase differences $\{\Delta\Delta\theta_{mn}\}$ of the two or more pairs $\{m,n\}$ of receivers such that the location of the signal source satisfies the distance differences $\{\Delta D_{mn}\}$ between the two or more pairs $\{m,n\}$ of said receivers.

According to another broad aspect of one or more embodiments of the present invention there is provided a system for locating a signal source, emitting a signal S. The system includes:

one or more phase accumulation modules adapted to obtain information indicative of the signals $\{S_n\}$ corresponding to the signal received by a number of at least two receivers $\{Rc_n\}$ (indexed n) during time intervals $\{\Delta t_n\}$. The phase accumulation modules are adapted to apply a first processing to each signal $S_n$ to determine an accumulated phase $\Delta\theta_n$ that is accumulated during the respective time interval $\Delta t_n$ during which the signal $S_n$ is received by the respective receiver $Rc_n$;

a differential phase processor that is adapted to apply second processing to the accumulated phases $\{\Delta\theta_n\}$ to determine differential phase differences $\Delta\Delta\theta_{mn}=(\Delta\theta_m-\Delta\theta_n)$ between the accumulated phases, $\Delta\theta_m$ and $\Delta\theta_n$, of the signals, $S_m$ and $S_n$, received by two or more pairs $\{m,n\}$ of the receivers, $Rc_m$ and $Rc_n$. The differential phase difference $\Delta\Delta\theta_{mn}$ between a pair of the receivers, $Rc_m$ and $Rc_n$, is indicative of a distance difference $\Delta D_{mn}$ between the changes, $\Delta d_m$ and $\Delta d_n$, in the distances, $d_m$ and $d_n$, of the respective receivers $Rc_m$ and $Rc_n$ from the signal source during the time intervals $\Delta t_m$ and $\Delta t_n$ respectively; and a source location processor that is adapted to apply a third processing to the differential phase differences $\{\Delta\Delta\theta_{mn}\}$ of the two or more pairs $\{m,n\}$ of receivers based on position data indicative of positions $\{R_n\}$ of the at least two receivers and of change $\{\Delta R_n\}$ in the positions $\{R_n\}$ during said time intervals $\{\Delta t_n\}$ respectively.

The source location processor determines a location of the signal source, such that the determined location satisfies that the differences between the changes, $\Delta d_n$ and $\Delta d_m$, in the distances, $d_n$ and $d_m$, from that location to the positions of the respective receivers during the respective time intervals $\Delta t_n$ and $\Delta t_m$ correspond to the distance differences $\{\Delta D_{mn}\}$ that are associated with (e.g., computed from) the differential phase differences $\{\Delta\Delta\theta_{mn}\}$.

According to some embodiments of the present invention the first processing for determining said accumulated phase $\Delta\theta_n$ includes determining a difference between a phase $\theta_n(t_0+\Delta t_n)$ of the signal $S_n$ at an end of the time interval $\Delta t_n$ and a phase $\theta_n(t_0)$ of the signal at a beginning of said time interval $\Delta t_n$. This operation may be performed for example by the phase accumulation modules of the system of one or more embodiments of the invention. To this end in certain implementations of the invention the phase accumulation modules apply first processing to unwrap the phase of said signal $S_n$ by carrying out the following:

(i) dividing/segmenting the signal $S_n$ received in the time interval $\Delta t_n$ into a plurality of time slots of durations shorter than the period T;

(ii) applying Fourier transform to signal portions of the signal $S_n$ in each of the time slots to respectively determine signal phases of the signal portions modulus $2\pi$;

(iii) processing the signal phases of the time slots to identify abrupt change of a signal phase of a successive time slot with respect to a signal phase of time slot preceding it, wherein a magnitude of the abrupt change satisfies the following: it is substantially larger than a noise level associated with said receiver $Rc_n$, and it is larger than $\pi$;

(iv) adding multiples of $2\pi$ to the signal phase for the successive time slot and to signal phases of each of the time slots succeeding it; and (v) repeating (iii) and (iv) for each pair of successive time slots.

According to some embodiments of the invention, the method and system are adapted to locate a signal source emitting signal $S_n$ that includes or is constituted by continuous-wave (CW) signal component(s).

For example, the signal source may be a stationary signal source emitting a CW signal, and wherein the technique one or more embodiments of the invention enables determining the location of such signal source by utilizing a number of receivers that is greater than the number of spatial dimensions, with respect to which the location of the signal source should be determined. In such cases the one or more phase accumulation modules of the system are adapted to obtain information indicative of the signals $\{S_n\}$ received from the signal source by a number of receivers $\{Rc_n\}$ that is at least the number of the spatial dimensions with respect to which the location of the signal source should be determined, plus one.

According to some embodiments, the method and system are adapted to locate a signal source emitting a modulated signal $S_n$ (i.e., the signal $S_n$ includes one or more signal sections modulated by at least one modulation pattern, such as frequency modulation, and/or one or more signal sections in the form of pulses). The technique of according to one or more embodiments of the invention includes identifying receipt timings by the receivers of the modulated signal sections and processing the receipt timings to remove/avoid ambiguities in determination of said differential phase differences $\Delta\Delta\theta_{mn}$. To this end the system according to one or more embodiments of the invention may include a time of arrival (TOA) module that is adapted to identify receipt timings of similarly modulated sections of the received signal.

In certain embodiments of the invention, specifically when locating a signal source of a modulated signal $S_n$ is sought, the technique/method further includes processing the receipt timings of the modulated signal sections at the receivers (e.g., utilizing a multilateration module/processor) to determine differential time of arrival (DTOA) data which is indicative of the different times of arrival of the similarly modulated signal sections to the different receivers. Accordingly the DTOA data is indicative of the location of the signal source. To this end, according to some embodiments of the present invention, both the differential phase data $\Delta\Delta\theta_{mn}$ and the DTOA data are used to determine the location of the signal source with reduced number of required receivers. In this case the minimal required number of receivers matches the number of spatial dimensions, with respect to which the location of the signal source should be determined.

According to certain embodiments of the present invention the first processing includes identifying similarly modulated sections in the signals $S_n$ and $S_m$ received by a pair $Rc_m$, $Rc_n$ of receivers; and selecting the timings of the time intervals $\Delta t_n$, $\Delta t_m$ of the pair $Rc_m$, $Rc_n$, during which to determine the accumulated phases $\Delta\theta_n$ and $\Delta\theta_m$, in accordance with receipt timings of these similarly modulated sections.

For instance, in some cases, the signal $S_n$ from the signal source is frequency modulated. The phase $\theta_n(t)$ of the signal $S_n$ is therefore a non-linear function of time. Accordingly, in certain embodiments of the invention, the technique includes identifying matching modulation patterns in the signals $S_n$ and $S_m$ received by the different receivers, and determining a common reference point in the signals $S_n$ and $S_m$. Then the timings of the time intervals $\Delta t_n$, $\Delta t_m$ of the corresponding receivers $Rc_n$, $Rc_m$ are set relative to the common reference point in their respective signals $S_n$ and $S_m$. In cases where the signal transmitted from the signal source includes multiple repetitions of the similar modulation pattern, the common reference point is determined relative to same or different sections of the signal, which are modulated by the repeated modulation pattern that is received by the receivers $Rc_n$, $Rc_m$. This allows to determine the differential phase $\Delta\Delta\theta_{mn}$ between the receivers while obviating a need to perform time synchronization in between the receivers $Rc_n$, $Rc_m$.

Yet in some embodiments of the present invention, the technique/method includes performing time synchronization between the receivers $Rc_n$, $Rc_m$ and utilizing the time synchronization to identify the similarly modulated sections. For instance the time synchronization may be performed by processing data indicative of the signals $S_n$ and $S_m$ received by the receivers to determine a time delay associated with a best-fit between them and synchronizing the timings of said $Rc_n$, $Rc_m$ based on said time delay.

As indicated above, in some embodiments a signal source, being a source of a pulsed signal, is considered. In such embodiments of the invention, the method/system is adapted to identify receipt timings of pulses of the signal by the different receivers and further utilizing differential time of arrival DTOA to determine the location of the signal source, thereby reducing the number of receivers required for identifying the location of the signal source.

Thus, the embodiments of the present invention provide a novel system and method for locating a signal source. The technique according to one or more embodiments of the invention is further described in more detail in the detailed description section below with references to the drawings illustrating various embodiments of the methods and systems of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1C are schematic illustrations exemplifying the technique for locating a signal source according to an embodiment of the present invention; wherein FIG. 1A is a flow chart of a differential phase method 100 of an embodiment of the invention for locating the signal source; FIG. 1B is a graphical illustration of the operation of the differential phase method by utilizing several receivers, and FIG. 1C is a block diagram of a system 200 for locating the signal source according to an embodiment of the present invention;

FIGS. 2A and 2B are schematic illustrations exemplifying a technique for locating a signal source of a pulsed/modulated signal according to an embodiment of the present invention; wherein FIG. 2A is a graphical illustration of the operation of the differential phase technique of an embodiment of the present invention in combination with the TDOA technique; and FIG. 2B is a flow chart exemplifying combination of multilateration (TDOA) operation with the differential phase method 100 according to an embodiment of the present invention; and FIGS. 3A-3C illustrate specific techniques for determining the accumulated phase of a received signal; wherein FIG. 3A is a flow chart exemplifying an implementation of the phase accumulation operation of method 100; and FIGS. 3B and 3C are graphical illustrations of accumulated phases determined according to the technique of FIG. 3A.

DETAILED DESCRIPTION OF EMBODIMENTS

Figure 1B:
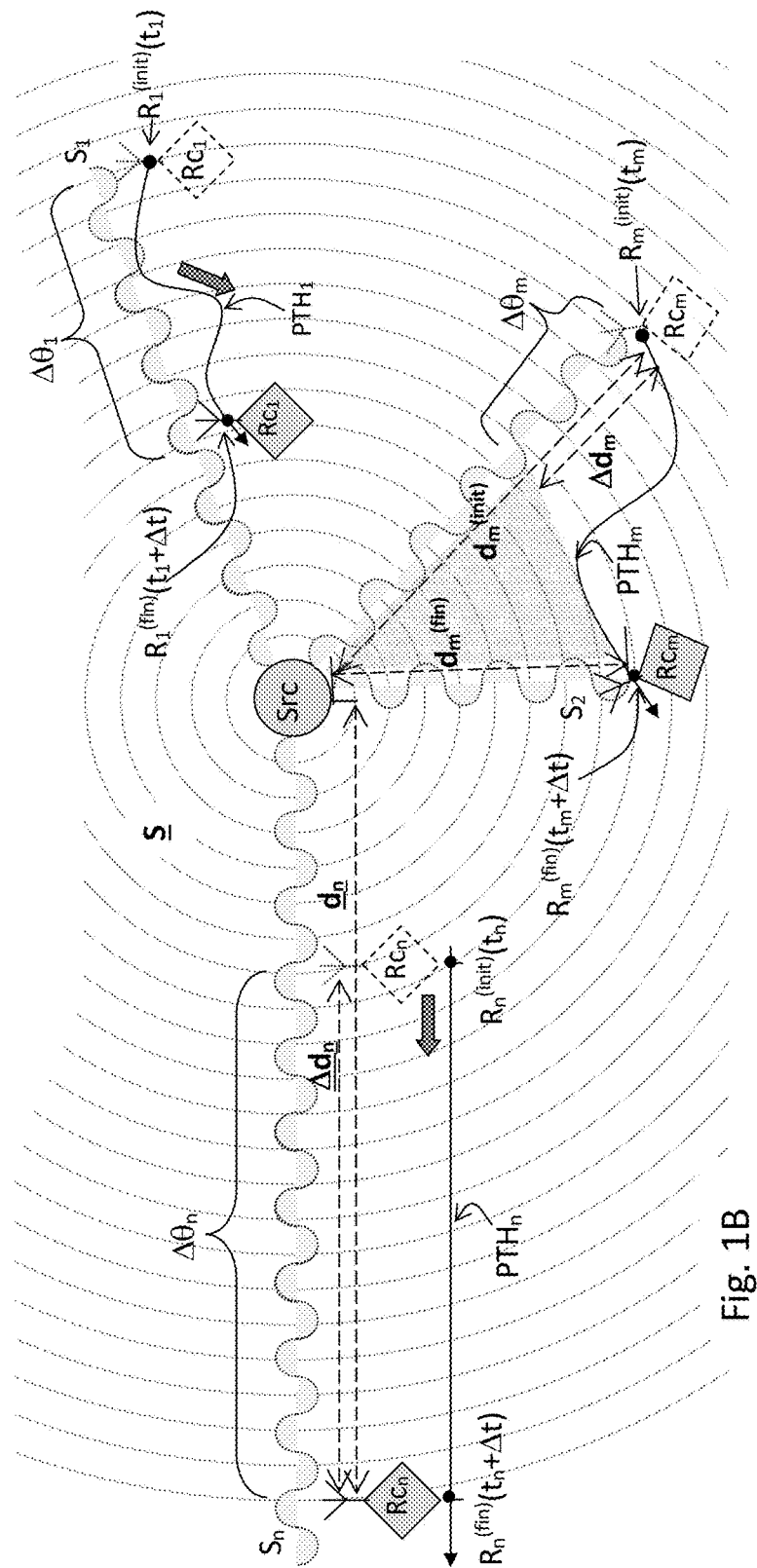
Figure 1C:
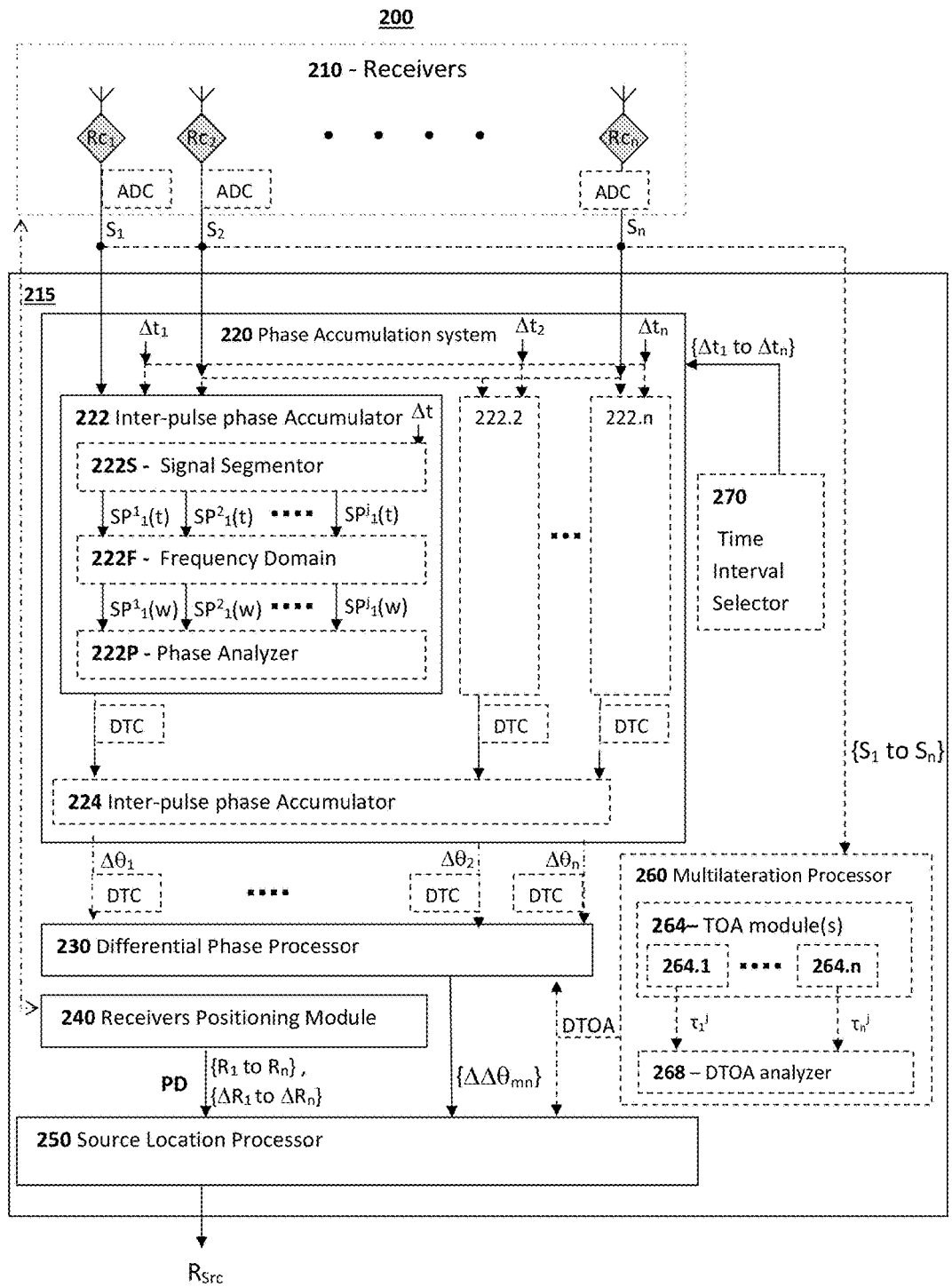

Reference is made together to FIGS. 1A, 1B and 1C exemplifying the technique o according to one or more embodiments of the present invention (also referred to in the following as a differential phase technique/method) for locating a signal source Src. FIG. 1A is a flow chart of a method 100 (differential phase method) for locating the signal source Src according to some embodiments of the present invention, FIG. 1B is a schematic illustration of the operation of several receivers $Rc_1$-$Rc_n$ for locating the signal source Src according to the method depicted in FIG. 1A, and FIG. 1C is a block diagram of a system 200 configured according to certain embodiments of the present invention for carrying out the differential phase technique (e.g., carrying out the operations of method 100) for locating the signal source Src. It should also be noted that the operations 110-160 may be performed in a centralized manner (e.g., in a central server) or, in some cases, certain of these operations, such as operation 110 and optionally/partially operation 120 (e.g., inter-pulse phase accumulation operation 122), may be performed by signal processing modules associated with (e.g., integrated-/connected-with and/or adjacent to) respective ones of the receivers $Rc_1$-$Rc_n$ while other operations such as 130-160 which concern data about the signals from several receivers, may be centralized and performed by central processing utility and/or distributed among several such utilities. The latter case provides for reducing the amount of information that needs to be transmitted from the receivers, as only the results (e.g., the inter-pulse accumulated phases) obtained by the processing of 110 and 122 needs to be communicated to the centralized/distributed processing utility(ies) instead of an abundance of data about the signals received by the receivers. To this end the system 200 may be a centralized and/or distributed system.

FIG. 1C depicts the functional modules/components of the system 200. The system is connectable to, and optionally includes, signal receivers 210, including a plurality of receivers $Rc_1$-$Rc_n$, capable of detecting an electro-magnetic signal S (e.g., radio-frequency (RF) signals) emitted from a signal source Src which is to be located. The signal receivers 210 generate respective signals/data $S_1$-$S_n$ indicative of the emitted portion of the signal S respectively received thereby. The system 200 includes signal processing system 215 connectable to the receivers $Rc_1$-$Rc_n$ for obtaining and processing the signals/data $S_1$-$S_n$ received thereby during certain respective time intervals $\Delta t_1$-$\Delta t_n$ and is configured and operable to process the signals/data $S_1$-$S_n$ utilizing position data PD indicative of the positions $R_1$-$R_n$ and the change in the positions $\Delta R_1$-$\Delta R_n$ of the receivers at the respective time intervals $\Delta t_1$-$\Delta t_n$ and thereby determine the location $R_{Src}$ of the signal source Src.

It should be noted that herein and in the following, except where explicitly denoted otherwise, the subscript indices (e.g., n, m and/or numerical indices) denote the index of the receivers $Rc_1$-$Rc_n$ their respective signals, and processing parameters/properties associated therewith. Also, pairs of such subscript indices (e.g., m,n or mn) denote processing parameters/properties associated with the pair m,n of such receivers. Also it should be understood that notation of the curly brackets enclosing a certain element/parameter denoted with the sub-index (e.g., $\{Rc_n\}$) are used herein to indicate a group/collection of such elements/parameters (e.g., the notation may designate a group including several or all of the receivers $Rc_1$-$Rc_n$).

According to one or more embodiments of the present invention at least some of the plurality of receivers $Rc_1$-$Rc_n$ are carried by separate/different vehicular platforms (e.g., terrestrial- and/or airborne- and/or marine- and/or space-vehicles), and at least some of which are in motion during the operation of the system 200 for locating the signal source Src. To this end, the plurality of receivers $Rc_1$-$Rc_n$ include at least two receivers and typically include three or more receivers capable of detecting the signal S emitted from a signal source Src, which is to be located. The number of receivers connected to (or otherwise in communication with) the system depends on the dimensionality of the space within which location of the signal source Src is desired (e.g., on whether determination of the location is required with respect to two or three dimensions). This is discussed in more detail below.

The signal processing system 215 includes phase accumulation system 220 configured and operable for applying a first processing to each of the signals $S_1$-$S_n$ received by the receivers $Rc_1$-$Rc_n$ to determine for each signal, e.g., $S_n$, an accumulated phase value $\Delta\theta_n$ that corresponds to the phase of that signal S accumulated during the time interval $\Delta t_n$ by the respective receiver $Rc_n$. That is the accumulated phase value $\Delta\theta_n$ corresponds to the accumulated unfolded (e.g., un-wrapped/non-cyclic) change of the phase of the signal $S_n$ during the time interval $\Delta t_n$, beginning at an initial time $t^{init}_n$ and ending at final time $t^{fin}_n = t^{init}_n + |\Delta t_n|$ (where here $|\Delta t_n|$ indicates the duration of the time interval $\Delta t_n$). The phase accumulation system 220 therefore determines the accumulated phases $\{\Delta\theta_n\}$ of the respective signals $\{S_n\}$ from the receivers $\{Rc_n\}$ during their time intervals $|\Delta t_n|$.

The phase accumulation system 220 includes one or more inter-pulse phase accumulator(s) 222 (and optionally also 222.2-222.n depicted in the figure) serving for determination (inter-pulse unwrapping) of the accumulated phase of continuous sections of the signal S received by the receivers (e.g., the accumulated phase during continuous sections such as pulses of the signal S or CW portions of the signal S). Optionally, for example for cases where the signal is pulsed and/or is not continuous, the phase accumulation system 220 also includes an intra-pulse phase accumulator 224 configured and operable for un-wrapping the phase of the signal received by each of the receivers at discontinued periods of the signal (e.g., at time intervals between pulses/CW sections of the signal and determining the intra-pulse accumulated phases of the signals received by each of the receivers. Then, by combining/adding the inter-pulse and the intra-pulse accumulated phases determined for each receiver, the accumulated phases $\Delta\theta_n$ of each of the receivers $Rc_n$ during the time interval of the period $\Delta t$ is determined/estimated for each of the receivers. As indicated above, ambiguity of $2\pi * f * \Delta t$ may still exist in the accumulated phases $\Delta\theta_n$ determined this way, but since the time intervals $\{\Delta t_n\}$ are of equal duration for all the receivers, then this ambiguity is resolved in the following when calculating the differential phases between the receivers. It should be noted that inter-pulse phase accumulator(s) 222 may include a plurality of modules (e.g., 222 and 222.2-222.n) residing respectively near/at each receiver, such that the inter-pulse phase unwrapping is performed locally at each receiver position, or alternatively one (possibly more) inter-pulse phase accumulator 222 may reside at the processing center and may perform inter-pulse phase unwrapping there. In the former case, lower data rates are required for communicating data from the receivers to the processing center, since only the accumulated phases of each pulse need to be communicated, and not information about the entire signal received by the receivers, as in the latter case.

The signal processing system 215 also includes a differential phase processor 230 generally located at the processing center. The differential phase processor is configured and operable to apply second processing to the accumulated phases $\{\Delta\theta_n\}$ to determine differential phase differences $\Delta\Delta\theta_{mn} = (\Delta\theta_m - \Delta\theta_n)$ between the accumulated phases, $\Delta\theta_m$ and $\Delta\theta_n$, of the signals, $S_m$ and $S_n$, received by two or more pairs $\{m,n\}$ of the receivers, $Rc_m$ and $Rc_n$. As indicated above, the differential phase differences $\Delta\Delta\theta_{mn}$ may still include certain ambiguity being in the order of $2\pi * f * \Delta t$ where f is the signal frequency, yet this ambiguity is resolved if $\Delta t$ is equal for the receivers $Rc_m$ and $Rc_n$. After resolving this ambiguity, the differential phase difference $\Delta\Delta\theta_{mn}$ between a pair of the receivers $Rc_m$ and $Rc_n$, is indicative of a distance difference $\Delta D_{mn}$ between the changes, $\Delta d_n$ and $\Delta d_m$ in the distances, $d_n$ and $d_m$ of the respective receivers $Rc_m$ and $Rc_n$ from the signal source Src during the time intervals $\Delta t_n$ and $\Delta t_m$ respectively. Accordingly, the signal processing system 215 also includes a source location processor 250 that obtains the differential phase differences $\{\Delta\Delta\theta_{mn}\}$ of the two or more pairs $\{m,n\}$ of receivers and is configured and operable to apply a third processing to the differential phase differences $\{\Delta\Delta\theta_{mn}\}$ based on position data PD indicative of positions $\{R_n\}$ of receivers and of changes $\{\Delta R_n\}$ in their positions $\{R_n\}$ during the respective time intervals $\{\Delta t_n\}$, and thereby determine the location $R_{Src}$ of the signal source Src. In this regard, it should be noted that the location $R_{Src}$ of the signal source that is determined in this way, satisfies that the differences $\Delta D_{mn} \equiv \Delta d_m - \Delta d_n$ between the changes $\Delta d_m$ and $\Delta d_n$ in the distances $d_m$ and $d_n$ from that location $R_{Src}$ to the positions of the respective receivers $R_m$ and $R_n$ during the respective time intervals $\Delta t_m$ and $\Delta t_n$ and matches the distance differences $\{\Delta D_{mn}\}$ that are computed based on the differential phase differences $\{\Delta\Delta\theta_{mn}\}$.

As will be readily appreciated by those versed in the art, there are various possible techniques for implementing the modules of the signal processing system 215. For instance, some of the modules and/or sub-modules of signal processing system 215 can be implemented by utilizing analogue signal processing means/circuits, and/or utilizing digital/computerized processing systems and/or by a combination of analogue and digital signal processing means/circuits. Components of the system which are implemented digitally may include or be associated with one or more digital processors, such as CPUs and/or DSPs for processing signals received, and with suitable samplers and/or analogue to digital converters (ADCs) for sampling the signals from the receivers and converting them to digital representation and/or possibly also with digital to analogue converters for converting digital signals to analogue forms in case the signals are processed by combination of analogue and digital means. As will be appreciated by those versed in the art, in case the system is implemented with analogue means, analogue circuits for implementing the operations described by method 100 may for example include a proper arrangement of signal amplifiers and signal frequency filters (e.g., band-pass filters) applying suitable amplification and/or filtering to the received signal to obtain desired frequency band thereof, signal mixers (e.g., homodyne/heterodyne) and possibly also local oscillators arranged to allow extraction of the phase of the signal, integrators and/or comparators configured and operable for generating signal indicative of the accumulated phase, and/or of the differential phase between the receivers. To this end, although the signal processing system 215 may be implemented by analogue means, in some embodiments it may be implemented in a more versatile manner by utilizing digital processing techniques.

For instance, in certain specific embodiments of the present invention, the receivers $\{Rc_n\}$, which may be for example antenna modules, generate an analogue signal corresponding to the signal S respectively received thereby from the signal source Src. The receivers {$Rc_n$} are associated with respective DACs converting analogue signals from the receivers into digital representations {$S_n$}, which are then fed to the signal processing system 215.

As indicated above, the receivers {$Rc_n$} are generally located remotely from one another and move with respect to one another. However, the process of locating the signal source Src involves processing together of certain properties of the signals from multiple of the receivers {$Rc_n$} (see the second and third processing indicated above and below). To this end, the vehicular platforms carrying the receivers, or some of them, may also carry respective data communication modules DTCs for communicating data indicative of certain properties of the signals {$S_n$} to the central processing center. The latter may also include a data communication module DTC for receiving the communicated data. As indicated above, in certain implementations the signal processing system 215 is implemented as a distributed system. For example certain stages of the processing, such as the first processing indicated above, is applied to each of the signals {$S_n$} received by the receivers {$Rc_n$}, by utilizing suitable processing modules (e.g., 222) of the processing system 215 located adjacent to the respective receivers {$Rc_n$} (e.g., at their vehicular platforms). For example, as shown in FIG. 1C, each of the receivers $Rc_1$-$Rc_n$ may be associated with a respective phase accumulator 220.1-220.n, located adjacent thereto and adapted for performing the first inter-pulse unwrapping. The phase accumulator system 220 performing the first processing, as well as the differential phase processor 230 and the source location processor 250 may be implemented by one or more computerized systems/modules each including at least a processor (e.g., CPC/DSP) and memory and storing computer readable code/instructions for implementing the first, second and/or third processing as described in more detail below with reference to method 100.

In some embodiments of the present invention the signal processing system 215 also includes, or is in communication with, receivers positioning module 240 operable to provide position data PD indicative of positions of the receivers {$Rc_n$} during the respective time intervals {$\Delta t_n$}. For each receiver $Rc_n$ the position data PD may indicate its position (vector) $R_n$ at two time points during the respective time interval, $R_n(t_n^{init})$ and $R_n(t_n^{fin})$, at least a first/initial and second/final time points within the time interval $\Delta t_n$. Alternatively, equivalently, position data PD may be indicative of the position $R_n$ of the receiver $Rc_n$ at one of the time points (e.g., $R_n(t_n^{init})$ or $R_n(t_n^{fin})$) and the change in that position $\Delta R_n$ during the time interval $\Delta t_n$ between $t_n^{init}$ and $t_n^{fin}$.

As indicated above and shown in FIG. 1B, the receivers $Rc_1$-$Rc_n$ or at least some of them, are carried and moved by vehicular platforms (not specifically shown) along respective paths $PTH_1$-$PTH_n$, which may be curved and/or straight paths. To this end, the receivers positioning module 240 may include and/or be in communication with any suitable positioning system(s), such as GPS systems installed on the vehicular platforms and/or Radar system tracking the vehicular platforms upon which the receivers {$Rc_n$} are installed, which can monitor the positions and/or motions of the respective vehicular platforms. In this regard, as will be appreciated by those versed in the art, the positioning module may include data communication capable of communication with positioning and/or tracking systems that are capable of tracking/monitoring/obtaining the positions of the receivers {$Rc_n$} (e.g., there are various known in the art types of such positioning/tracking systems which can be used in the embodiment of the present invention to obtain positions of the signal receivers). As indicated above, according to some embodiments of the present invention some of the receivers {$Rc_n$}, although not all of them, may be stationary (not moving) receivers. In this case the static predetermined positions of the stationary receivers may be stored in a local and/or remote memory module and may be retrieved by the receivers' positioning module 240 directly and/or via the data communication.

Further details on the technique of one or more embodiments of the present invention for determining the location $R_{Src}$ of the signal source Src will now be described with reference to method 100 of FIG. 1A and to the schematic illustration on FIG. 1B. As described below, certain of the modules of the system 100 may be configured and operable to perform the respective method operations.

In operation 105 of method 100 a number of at least two signal receivers {$Rc_n$} capable of detecting the signal S emitted from the signal source Src that should be located, are provided. The receivers {$Rc_n$} are mounted on respective moving platforms, which carry them along respective paths (curved or straight paths) $PTH_1$-$PTH_n$.

In FIG. 1B, three receivers $Rc_1$, $Rc_m$ and $Rc_n$ are explicitly depicted and shown for example to be respectively moving along: curved path $PTH_1$ in the general radial direction to the signal source, curved path $PTH_m$ in an arbitrary general direction with respect to the signal source, and straight path $PTH_n$ in the radial direction to the signal source.

The signal S emitted from the source during the movement of the receivers is illustrated schematically in FIG. 1B by the concentric circles depicting the equi-potential lines of the waveform of the signal S at a certain instant. The specific portions $S_1$, $S_m$ and $S_n$ of the signal S received by the receivers $Rc_1$, $Rc_m$ and $Rc_n$ during their movement along the paths $PTH_1$, $PTH_m$ and $PTH_n$ are also illustrated schematically.

Operation 110 includes providing data indicative of the signals $S_1$, $S_m$ and $S_n$ (generally {$S_n$}), which are received and possibly sampled by the receivers $Rc_1$, $Rc_m$ and $Rc_n$ (generally referred to as {$Rc_n$}) during their movement along their respective paths (it is indicated that one of the receivers may also be stationary). The provided data of the signals $S_1$, $S_m$ and $S_n$ may include only the part of those signals received by those receivers {$Rc_n$} during respective time intervals {$\Delta t_n$} during which the receivers move in between respective first positions {$R_n^{(init)}$} to second positions {$R_n^{(fin)}$} along their respective paths {$PTH_n$}. For example in FIG. 1B the signals $S_1$, $S_m$ and $S_n$ are provided, while the respective receivers $Rc_1$, $Rc_m$ and $Rc_n$ move from their first positions $R_1^{(init)}(t_1)$, $R_m^{(init)}(t_m)$, and $R_n^{(init)}(t_n)$ at initial times $t_1$, $t_m$ and $t_n$, to second positions $R_1^{(fin)}(t_1+\Delta t)$, $R_m^{(fin)}(t_m+\Delta t)$ and $R_n^{(fin)}(t_n+\Delta t)$ at the final times $t_1+\Delta t$, $t_m+\Delta t$ and $t_n+\Delta t$. Here the time intervals {$\Delta t_n$}, for which the signals $S_1$, $S_m$ and $S_n$ are provided, correspond to respectively {$\Delta t_n=[t_n, t_n+\Delta t]$} (i.e. $\Delta t_1=[t_1, t_1+\Delta t]$, $\Delta t_m=[t_m, t_m+\Delta t]$, and $\Delta t_n=[t_n, t_n+\Delta t]$). It is noted that the time intervals, during which the signals $S_1$, $S_m$ and $S_n$ are provided, are not necessarily synchronized. More specifically the method 200 and system 100 according to an embodiment of the invention can be operated to determine the location of the signal source by processing the signals received from the different receivers {$Rc_n$} at different times {t} (e.g., it may be that $t_1 \neq t_m \neq t_n$). This is an advantage of the technique according to one or more embodiments of the present invention, as generally the receivers need not be time synchronized.

It is noted, and also depicted in FIG. 1B, that the signals {$S_n$}, which are processed to determine the location of the signal source Src, are signals that were received by the receivers at time intervals $\{\Delta t_n\}$ of equal duration (the duration is indicated by $\Delta t$). As will be further explained below, this obviates a need to resolve certain ambiguities, which may arise when computing the accumulated phases $\{\Delta \theta_n\}$ of the signals $\{S_n\}$ (e.g., during the unwrapping/unfolding procedures 122, 124 of the first processing step 120).

As indicated above, operation 120 includes applying first processing to each signal $S_n$ of the signals $\{S_n\}$ to determine the phase $\Delta \theta_n$ that is accumulated during its respective time interval $\Delta t_n$. As shown in FIG. 1B, during the reception of each signal $S_n$, of the signals $\{S_n\}$ shown in the figure, its respective receiver $Rc_n$ may move from an initial position $R_n^{(init)}(t_n)$ at initial times $t_n$, to final position $R_n^{(fin)}(t_n+\Delta t)$ at final time $t_n+\Delta t$ within the time interval $\Delta t_n$. The accumulated phase $\Delta \theta_n$ in the received signal during that time interval is therefore attributed to:

(1) change in the phase of the signal during the time duration (e.g., $\Delta t$) of the time interval $\Delta t_n$; and (2) the change in position $R_n$ of the respective receiver $Rc_n$ in between first/initial and second/final times $t_n^{(init)}$ and $t_n^{(fin)}$ in the time interval $\Delta t_n$, and more specifically the change $\Delta d_n$ of its distance $d_n$ from the signal source Src during that time interval, as depicted in the figure. More specifically the change $\Delta d_n$ of the distance $d_n$ of the $n^{th}$ receiver is given by:

$$\Delta d_n = d_n(t_n^{fin}) - d_n(t_n^{init}) = |R_n(t_n^{fin}) - R_{Src}(t_n^{fin})| - |R_n(t_n^{init}) - R_{Src}(t_n^{init})|$$   Eq. 1

To this end the accumulated change $\Delta \theta_n$ in the phase of the signal $S_n$ received during the time interval $\Delta t_n$ by receiver $Rc_n$ is given by:

$$\Delta \theta_n = 2\pi f \Delta t + 2\pi t \Delta d_n / \lambda$$   Eq. 2 where f is the frequency (e.g., carrier frequency) of the signal S emitted from the signal source Src, $\Delta t$ is the duration of the time interval $\Delta t_n$, $\lambda$ is the wavelength of the signal S given by $\lambda \equiv C/f$ (where C being the speed of light), and $\Delta d_n$ is the change in the distance $d_n$ of the $n^{th}$ receiver from the source Src during the time interval as given by Eq. 1.

Thus, in operation 120 of method 100 of FIG. 1A, the signal $S_n$ is processed to determine the accumulated phase $\Delta \theta_n$, which correspond to the total phase that is accumulated in the signal $S_n$ during the time interval $\Delta t_n$. A specific method of determining the accumulated phase $\Delta \theta_n$, which is used according to certain embodiments of the systems and methods of the present invention, is described in more detail below with reference to FIG. 3A.

By inverting Eq. 2, the change in the distance $\Delta d_n$ to the source Src can be expressed in terms of the accumulated phase $\Delta \theta_n$ as follows: $\Delta d_n = (C/2\pi f)\Delta \theta_n - C\Delta t$. By combining this with Eq. 1 above, a relation between the accumulated phase $\Delta \theta_n$ and the positions $R_n$ and $R_{Src}$ of the receiver $Rc_n$ and the signal source Src can be obtained as follows:

$$|R_n(t_n^{init}+\Delta t) - R_{Src}(t_n^{init}+\Delta t)| - |R_n(t_n^{init}) - R_{Src}(t_n^{init})| = (C/2\pi f)\Delta \theta_n - C\Delta t$$   Eq. 3 where the time interval $\Delta t$ during which the phase is accumulated is given by:

$$\Delta t_n = [t_n^{init}, t_n^{fin}] = [t_n^{init}, t_n^{init}+\Delta t]$$

It is noted that the location of the signal source Src cannot be generally resolved from Eq. 3 directly. This is because of the large ambiguity which may be included in the value of the accumulated phase $\Delta \theta_n$. For instance, considering using time intervals of duration $\Delta t=1$ millisecond for the duration for locating a signal source of a signal S having frequency $f=10$ GHz, the ambiguity in the accumulated phase $\Delta \theta_n$ would be in that case very large, in the order of $2\pi * f * \Delta t \sim 2\pi * 10^7$ radians. With such large ambiguity it is practically impossible to resolve the location of the signal source by using Eq. 3 directly. However this is solved according to the technique of an embodiment of the present invention by measuring the accumulated phases $\{\Delta \theta_n\}$, which are accumulated during equal time durations $\Delta t$ at different receivers $\{Rc_n\}$. This is followed, as described in more detail below, by calculating the differences $\Delta\Delta \theta_{mn}$ (referred to herein as differential phases) between the accumulated phases $\Delta \theta_m$, $\Delta \theta_n$ of different pairs $\{m,n\}$ of receivers (see Eq. 4 below) and determining the location of the signal source Src from these differential phases. In this way the ambiguity of the accumulated phases $\{\Delta \theta_n\}$ is cancelled out/reduced significantly when calculating the differential phases $\{\Delta\Delta \theta_{mn}\}$, and the location of the signal source Src can be accurately determined.

Thus, operation 130 includes obtaining the accumulated phases $\{\Delta \theta_n\}$ (e.g., $\{\Delta \theta_1, \Delta \theta_m$ and $\Delta \theta_n\}$) determined for the signals $\{S_n\}$ of the plurality of receivers and applying a second processing to determine differential phase $\Delta\Delta \theta_{mn}$ between the accumulated phases, $\Delta \theta_m$ and $\Delta \theta_n$, of the signals, $S_m$ and $S_n$, received by several pairs $\{m,n\}$ of the receivers $Rc_m$ and $Rc_n$. The number of different pairs $\{m,n\}$ of the receivers for which the differential phase $\Delta\Delta \theta_{mn}$ should be determined depends on the dimensionality of the space within which location of the signal source Src is desired and on whether only the location of the source Src should be determined. For each such pairs $\{m,n\}$ of receivers, the differential phase $\Delta\Delta \theta_{mn}$ is determined as follows:

$$\Delta\Delta \theta_{mn} = (\Delta \theta_m - \Delta \theta_n)$$   Eq. 4

And more specifically by substituting Eq. 2 into Eq. 4:

$$\Delta\Delta \theta_{mn} = 2\pi/\lambda(\Delta D_m - \Delta d_n) + 2\pi f \cdot (|\Delta t_m| - |\Delta t_n|).$$   Eq. 5

As indicated above, the time intervals $\Delta t_m$ and $\Delta t_n$ of each pair $\{m,n\}$ of the receivers for which the differential phase is calculated are of equal durations, namely $|\Delta t_m| = |\Delta t_n| \equiv \Delta t$. Thus ambiguities in the accumulated phases $\Delta \theta_m$, $\Delta \theta_n$ are resolved. Accordingly, the second term in Eq. 5 nullifies and the following relation is obtained for each pair $\{m,n\}$ of receivers for which the differential phase is computed in 130:

$$\Delta\Delta \theta_{mn} = 2\pi/\lambda(\Delta d_m - \Delta d_n).$$   Eq. 6

Substituting Eq. 1, the differential phase $\Delta\Delta \theta_{mn}$ is obtained in terms of the positions of the pair $\{m,n\}$ of receivers, $Rc_m$ and $Rc_n$, and the position of the source Src at initial and final times $t_m^{init}$, $t_m^{fin}$ and $t_n^{init}$, $t_n^{fin}$ in the respective time intervals, $\Delta t_m$ and $\Delta t_n$.

$$\Delta\Delta \theta_{mn} = 2\pi/\lambda[(|R_m(t_n^{fin}) - R_{Src}| - |R_m(t_m^{init}) - R_{Src}|) - (|R_n(t_n^{fin}) - R_{Src}| - |R_n(t_n^{nut}) - R_{Src}|)]$$   Eq. 7

Therefore method 100 includes operation 140 in which the position data PD is provided (e.g., obtained from positioning modules 240, associated with the receivers, and/or monitoring their respective positions). As indicated above, the position data PD includes data indicative of position (vector) of each receiver $Rc_n$ in at least two, initial and final, time points, $t_n^{init}$ and $t_n^{fin}$, within the respective time interval $\Delta t_n$ of the receiver; namely providing $R_n(t_n^{init})$ and $R_n(t_n^{fin})$. This is equivalently indicative of the position $R_n$ of the receiver $Rc_n$ at one of the time points (e.g., $R_n(t_n^{init})$) and the change in that position $\Delta R_n$ during the time interval $\Delta t_n$.

In view of the above, the only remaining unknown variable left in Eq. 7 are those related to the location of the signal source: $R_{Src}$. Thus in operation 250 a third processing is applied to determine the location $R_{Src}$ of the signal source based on the differential phase $\Delta\Delta\theta_{mn}$ obtained for different pairs {m,n} of the receivers in operation 130. This is achieved by solving a set of Eq. 7 above for different pairs {m,n} of the receivers {$Rc_n$} while utilizing the positions {$R_n$} of the receivers {$Rc_n$} at their respective time intervals as obtained in operation 140 and also utilizing the differential phases for different pairs of receivers $\Delta\Delta\theta_{mn}$ obtained in operation 130.

It should be noted that in certain embodiments of the system and method of the present invention the signal source Src is assumed and/or is known to be stationary. In this case, the velocity $V_{Src}$ of the signal source needs not to be determined and/or it is assumed zero $V_{Src}=0$. In such cases the only unknown variable that needs to be determined by the set of Eq. 7 is the stationary vector location of the signal source Src. It is noted that the number M of independent pairs of receivers that can be matched given that there are N receivers is M=N−1. Accordingly, for a given number of N receivers {$Rc_n$}, a set of up to M linearly independent equations such as Eq. 7 may be processed in operation 150 to determine the location $R_{Src}$ of the signal source Src. As the location $R_{Src}$ is a vector, the number of unknown variables in Eq. 7 actually depends on the dimensionality D of the space within which it should be determined. Thus considering the space dimensionality D, the number V of unknown variables is therefore in this case: V=D. Therefore V is the minimal number of independent pairs of receivers for which differential phase should be computed in 130 in order to solve the location of the signal source. The maximal number M of linearly independent equations, similar to Eq. 7, that can be obtained when utilizing N receivers, is M=N−1. Therefore in case of the stationary signal source, the number N of required receivers should satisfy M≥V, that is:

$$N>D. \quad \text{Eq. 8}$$

Thus, for two or three space dimensions D=2 or D=3, only a number of N=3 receivers or N=4 receivers are required respectively. Possibly additional receivers can be used to locate the signal source with improved accuracy.

In view of the above, operation 150 applies a third processing to determine the location $R_{Src}$, of the signal source Src, based on the position data PD of the receivers {$Rc_n$} and the differential phase differences {$\Delta\Delta\theta_n$} determined for two or more pairs {m,n} of receivers. More specifically, according to some embodiments of the present invention, in 150 a set of at least V linearly independent equations similar to Eq. 7 obtained for at least V independent pairs {m,n} of the receivers {$Rc_n$} are processed/computed and solved to determine the location $R_{Src}$, of the signal source Src.

Optionally, in certain embodiments of the present invention, method 100 further includes operation 160 which inter-alia provides for further reducing the number N of receivers required for locating the signal source Src. This is achieved by determining the location $R_{Src}$ of the signal source Src using multilateration (otherwise also known and further referred to in the following as differential time of arrival (DTOA)), in combination with the differential phase technique described above with reference to operations 110 to 150 of method 100. Indeed as will be appreciated by those versed in the art, DTOA techniques utilize several receivers (e.g., {$Rc_n$}) at different known locations (e.g., {$R_n$}) to estimate the location $R_{Src}$ of a signal source Src based on the differential time of arrival at which a signal S emitted from the signals source Src reaches the different receivers, even without having information regarding the time at which the signal S was transmitted/emitted from the signal source Src.

Figure 2A:
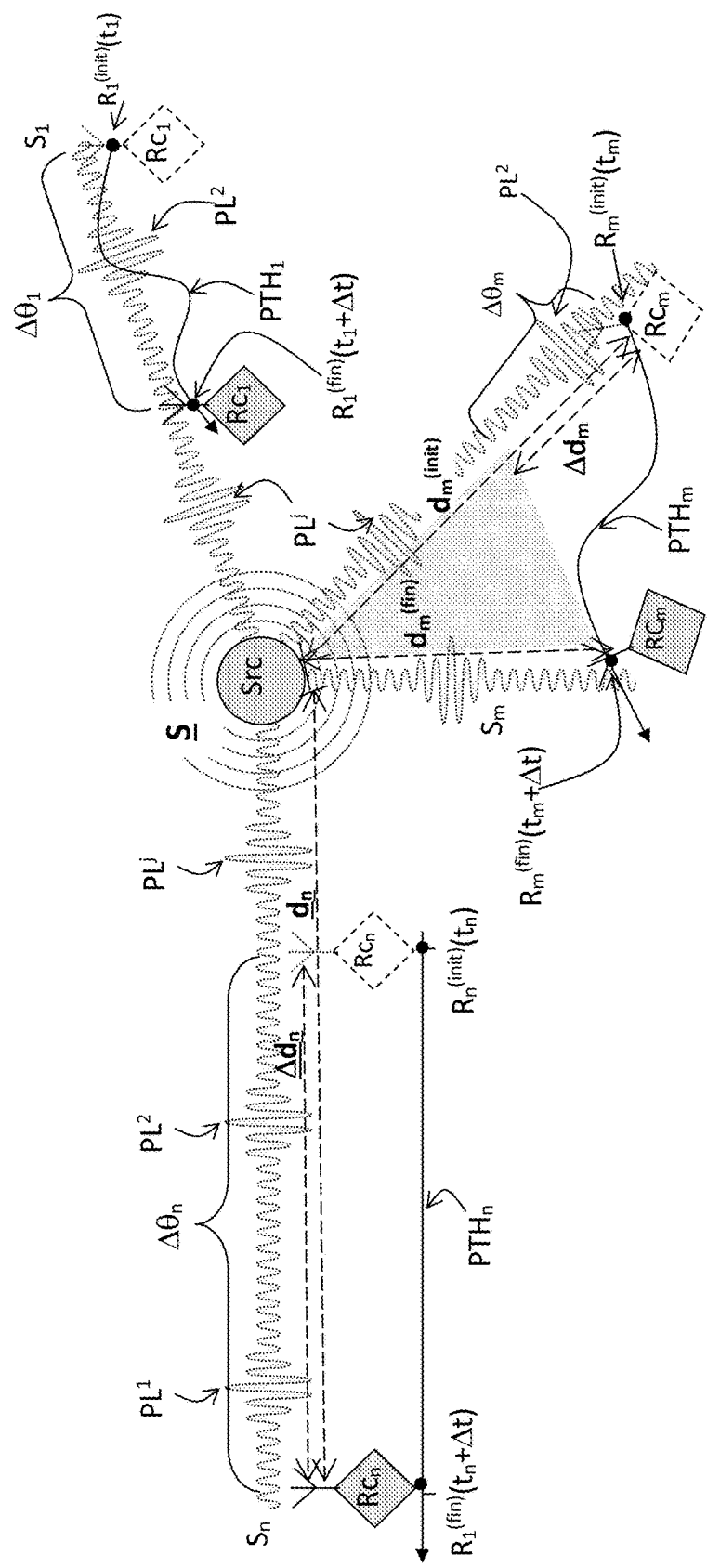

However, to achieve that, the signal S should be modulated by a certain modulation pattern, such as a pulse. This is illustrated for example in FIG. 2A which is a schematic illustration of the operation of several receivers $Rc_1$-$Rc_n$ according to an embodiment of the method 100 for locating the signal source Src by utilizing a combination of the differential phase technique as described for example above, and DTOA technique. In FIG. 2A reference numerals similar to those of FIG. 1B are used to designate elements which are used to locate the signal source Src by the differential phase technique according to one or more embodiments of the invention. To this end, the differential phase technique used in this case is in general similar to that described above with reference to FIGS. 1A to 1C. As shown in FIG. 2A, the receivers {$Rc_n$} are moving along respective paths $PTH_1$-$PTH_n$, which may be curved and/or straight paths. The signal S emitted from the signal source Src during the movement of the receivers {$Rc_n$} is illustrated schematically in FIG. 2A by the concentric circles depicting the equi-potential lines of the waveform of the signal S at a certain instant. The portions $S_1$, $S_m$ and $S_n$ of the signal S that are received by the receivers $Rc_1$, $Rc_m$ and $Rc_n$ during their movement along their respective paths $PTH_1$, $PTH_m$ and $PTH_n$ are illustrated schematically. As shown, the signal S is in this case a modulated signal including certain modulation patterns {$PL^j$} applied to the carrier wave of the signal. In the following, for clarity, the signal S may be modulated by modulation patterns formed according to various techniques, such as Amplitude Modulation (AM), Frequency Modulation (FM) (e.g., regular FM or linear FM) or any other modulation technique (e.g., Phase Modulation). FIG. 2A shows schematically several modulated sections of the signal S, referenced $PL^1$, $PL^2$ and $PL^j$. In the following, for clarity, these modulation patterns are considered in the form of pulses.

Certain embodiments of the system 200 of the present invention, include multilateration processor 260, such as that illustrated for example in FIG. 1C, which facilitates determination/resolving of the location of the source Src by utilizing a combination of the multilateration positioning techniques and the differential phase technique indicated above. The receiver {$Rc_n$} receives signals {$S_n$} corresponding to the emitted signal S, and data/signal indicative of the signal S from each receiver $Rc_n$ is provided to a multilateration processor 260. The latter includes a TOA module 264, which processes the received signal S and records the times of arrival {$\tau_n$} of the signal $S_n$, or of specific portion(s) thereof, to the receivers {$Rc_n$}. In other words, the TOA module 264 may be adapted to determine the receipt timings of similarly modulated portions/sections of the received signals {$S_n$} to match/synchronize between the similarly modulated portions/sections of the signal S received by the different receivers {$Rc_n$}, and synchronizing the time intervals $\Delta t_m$ and $\Delta t_n$, so that the time intervals $\Delta t_m$ and $\Delta t_n$ from which the differential phase differences $\Delta\Delta\theta_{mn}$ are determined, correspond to similarly modulated signal sections by the respective receivers (as described with reference to operation 128.2 below).

In this connection, it should be understood that in case the signal S from the signal source is a pulsed signal which includes one or more pulses, indexed j, then the TOAs $\tau_1^j \ldots \tau_n^j$ of the arrival of any pulse $PL^j$ (indexed j) to the n different receivers {$Rc_n$} may be recorded, by identifying the rise time of the pulse at the receiving path/channel of the receivers. In case the signal source emits a modulated CW signal S (i.e. not pulsed), the TOAs {$\tau_1 \ldots \tau_n$} of the signal S to the n different receivers {$Rc_n$} may be determined by cross correlating the signals $\{S_1 \ldots S_n\}$ received by different receivers to determine/measure the relative time difference between their reception times. It is understood that in the former case, where the signal is pulsed, the TOAs may be optionally determined by a plurality of modules 264.1-264.$n$ which may be optionally included/located at/near the receivers $Rc_1$-$Rc_n$, and adapted to process the signals $S_1$-$S_n$ respectively received thereby to identify their profile (rise and/or fall times) and thereby determine the times of arrival $\tau_1^j \ldots \tau_n^j$ of pulse j by the different receivers. However, when the signal is a modulated CW signal, then cross correlation should be performed, and therefore the data indicative of the received signals $S_1$-$S_n$ is communicated to the processing center. Such cross correlation can be performed by a DTOA module, which resides at the processing center and is suitably configured and operable to perform the above described cross-correlation operations. It is understood that the cross correlation can also be used to determine the DTOA of a pulsed signal.

The multilateration processor 260 may also include a differential time of arrival (DTOA) analyzer 268 that is adapted to receive the times of arrival $\tau_1^j \ldots \tau_n^j$ of the one or more pulses j and utilize these to determine one or more relations indicative of the location $R_{Src}$ of the signal source Src relative to the locations $\{R_n\}$ of the receivers $\{Rc_n\}$. To this end, in some embodiments of the present invention, the TOA module(s) 264 may be a plurality of distributed modules arranged/placed at/adjacent to the respective receivers, and the DTOA analyzer 268 may be configured at a central processing center and adapted to obtain data indicative of the times of arrival $\tau_1^j \ldots \tau_n^j$ from the TOA module(s) 264 and process this data to determine a relation between the locations of the receivers and the location of the source. Such configuration may reduce the required data transmission bandwidth between the receivers and the central processing center as only the times of arrival $\tau_1^j \ldots \tau_n^j$ need to be transmitted between them in this case (and not the complete information on the received signals as may be the case when the TOA module(s) 264 are centralized in the central processing center).

The use of the DTOA technique in operation 160 performed by the system 200 and method 100 is exemplified in more detail in the following with reference to the flow chart of FIG. 2B.

Operations 162 and 164 are typically performed by the TOA module(s) 264 (by modules 264.1-264.$n$) located adjacent to the receivers $\{Rc_n\}$. In 162 a modulated signal S from the signal source Src including one or more modulation patterns (e.g., pulses) $\{PL^j\}$ is received by the receivers $\{Rc_n\}$. In 164 the corresponding signals $\{S_n\}$ respectively obtained by the receivers $\{Rc_n\}$ are processed (e.g., sampled and analyzed) to identify at least one modulation-pattern/pulse $PL^j$ therein (such identification can be performed by cross-correlation with signals received by other receivers and/or by identifying predetermined modulation patterns, such as the rise/fall time of a pulse). Then, the times of arrival (TOAs) $\{\tau_n^j\}$ of the at least one pulse/modulation pattern $PL^j$ at two or more of the receivers $\{Rc_n\}$ are recorded. As indicated above, in some implementations (e.g., when the signal is pulsed) the TOAs $\{\tau_n^j\}$ may be determined by TOA modules 264 near/at the receivers $\{Rc_n\}$ and then be communicated from the respective receivers $\{Rc_n\}$ to the DTOA analyzer 268 which may reside at a central processing center. Alternatively, e.g., in the case of modulated CW signal S, the DTOAs $\{\Delta\tau_{mn}^j\}$ may be determined by DTOA module residing at a central processing center.

In operation 165, sync data indicative of time synchronization of the receivers may be obtained and used to process and synchronize the times of arrival $\{\tau_n\}$ obtained by the receivers $\{Rc_n\}$. The sync data may be data indicative of a time differences/lags between the clocks of the different receivers and a certain reference clock. The sync data may be obtained by any suitable known in the art time sync technique. Accordingly the times of arrival $\{\tau_n\}$ may be synced by adding thereto the corresponding time lag.

In 166, the differential time of arrival (TDOA) $\Delta\tau_{mn}^j$ between the times of arrival of at least one pulse $PL^j$ to the one or more pairs $\{m,n\}$ of the receivers is determined/computed. The DTOA may be computed in operation 166 (e.g., by DTOA analyzer 268) as follows:

$$\Delta\tau_{mn}^j = \tau_m^j - \tau_n^j \qquad \text{Eq. 9}$$

As described in the following, according to various embodiments of the present invention, the DTOA data, including data indicative of the differential times of arrival $\Delta\tau_{mn}^j$ of one or more pulses to different receivers, may be further used to carry out one or both of the optional operations 168 and 169 to provide one or more of the following:

(i) optional operation 168 carrying out the third processing (operation 150 of method 100) to determine the location of the signal source Src while utilizing the differential times of arrival $\Delta\tau_{mn}^j = \tau_m^j - \tau_n^j$ of the pulse $PL^j$ to the receivers $Rc_m$ and $Rc_n$ in addition to the differential phases $\Delta\Delta\theta_{mn}$ between pairs of the receivers, $Rc_m$ and $Rc_n$. This provides for reducing the number of receivers required for determining the location of the signal source, and/or for improving the accuracy of locating the signal source. As described more specifically below, in this way, two or three receivers may suffice to determine the location $R_{Src}$ of the signal source Src in two or three dimensions; and/or (ii) optional operation 169—utilizing the differential times of arrival $\Delta\tau_{mn}^i$, $\Delta\tau_{mn}^j$ of two or more pulses $PL^i$ and $PL^j$ to resolve ambiguities, which may arise in determination of the differential phases $\Delta\Delta\theta_{mn}$ in the second processing (operation 130 of method 100). In this way, the location of the signal source may be determined unambiguously and with improved reliability.

Turning now to optional operation 168, a relation between the DTOA $\Delta\tau_{mn}^j$ and the locations $R_m$ and $R_n$ of the pair $\{n,m\}$ of receivers $Rc_m$ and $Rc_n$ and the location $R_{Src}$ of the signal source Src may be expressed as follows:

$$\Delta\tau_{mn}^j = (1/C)[|R_m(\tau^j) - R_{Src}(\tau^j)| - |R_n(\tau^j) - R_{Src}(\tau^j)|] \qquad \text{Eq. 10}$$

where here changes in the locations $R_m$, $R_n$ of the receivers during the propagation time of the pulse S in between the signal source $R_{Src}$ and the respective receivers is considered to be negligible (this assumption is plausible since the receivers are moving with velocities much lower than the speed of light C of the signal). Accordingly, the time $\tau^j$ in Eq. 10 indicates the nominal time of the emission/receipt of the pulse j.

In 168 the relation expressed for example in Eq. 10 is used to determine the location $R_{Src}$ of the signal source Src. In this regard it should be noted that operation 168 may be actually be included and/or performed in the scope of the third processing described above (e.g., in the scope of operation 150 described above) to determine the location $R_{Src}$ of the signal source Src based on the differential phase $\Delta\Delta\theta_{mn}$ relation expressed in Eq. 7 in conjunction with the DTOA relation $\Delta\tau_{mn}^j$ expressed in Eq. 10 for several pairs of the receivers $\{Rc_n\}$. In some embodiments of the present invention, which concern locating signal sources emitting modulated/pulsed signals, the location $R_{Src}$ of the signal source Src may be determined based on both the differential phase $\Delta\Delta\theta_{mn}$ relation expressed in Eq. 7 in conjunction with the DTOA relation $\Delta\tau^j_{mn}$ expressed in Eq. 10, thus further reducing the number of receivers that are required for determining the location of the signal source. For a given number N of receivers, the number of independent pairs is as indicated above N−1 and therefore the maximal number M of linearly independent equations, similar to Eq. 7 and Eq. 10 is M=N 1. Considering space dimensionality D, the number V of unknown variables is associated with determination of the vector location $R_{Src}$ of the signal source: V=D. Thus, solving a set of a number of at least 2M≥V of linearly independent equations is required to obtain the location of the source. Accordingly, the required number N of receivers should satisfy:

$$2N > D+1 \qquad \text{Eq. 11}$$

That is, a number of N=2 or N=3 receivers may suffice for determining the vector location $R_{Src}$ of the signal source Src in two or three dimensions (D=2 or D=3) respectively.

Turning now to optional operation 169, it should be noted, and also indicated above, that the differential phase difference $\Delta\Delta\theta_{mn}$, which is computed in operation 130, is indicative of a difference $\Delta d_n - \Delta d_m$ between the changes $\Delta d_n$ and $\Delta d_m$ occurring during a certain time interval $\Delta t$, in the distances, $d_n$, and $d_m$ of the respective receivers $Rc_m$ and $Rc_n$ from the signal source Src. In some cases, e.g., when the signal source emits a CW signal, the differential phase difference $\Delta\Delta\theta_{mn}$ that is accumulated over a relatively long time interval $\Delta t$, for example in the order of one second, may be computed in order to facilitate highly accurate and reliable determination of the location of the signal source with improved SNR. In other cases, for instance when the signal is pulsed, it may be sufficient to calculate the differential phase over shorter durations in the order of a few milliseconds.

As will be further explained in more detail below, in cases where the signal S is modulated (e.g., S may be a pulsed signal), then operation 120 for computing the accumulated phases $\Delta\theta_m$ and $\Delta\theta_n$ at the receivers $Rc_m$ and $Rc_n$ may yield ambiguous results when the PRI is large and accordingly the differential phase $\Delta\Delta\theta_{mn}$ computed in 130 may become ambiguous. This might impair the accuracy and reliability of the location of the signal source determined in such scenarios.

However, according to some embodiments of the present invention, operation 169 above is performed to resolve such possible ambiguities and utilize the DTOA data determined in 166 to disambiguate the differential phase $\Delta\Delta\theta_{mn} = \Delta\theta_m - \Delta\theta_n$ between the accumulated phases $\Delta\theta_m$ and $\Delta\theta_n$ accumulated by the pairs {n,m} of the receivers $Rc_m$ and $Rc_n$, thereby unambiguously resolving their respective differential phase $\Delta\Delta\theta_{mn}$ and accurately and reliably determining the location of the signal source. This is based on the understanding that the differential phase $\Delta\Delta\theta_{mn}$, which is indicative of a difference $\Delta d_n - \Delta d_m$ between the changes $\Delta d_n$ and $\Delta d_m$ in the distances, $d_n$ and $d_m$, of the respective receivers $Rc_m$ and $Rc_n$ from the signal source Src during the time interval $\Delta t$, corresponds to the difference $\Delta\Delta\tau^{ij}_{mn} = \Delta\tau^j_{mn} - \Delta\tau^i_{mn}$ between the differential times of arrival $\Delta\tau^i_{mn}$, $\Delta\tau^j_{mn}$ of two pulses $PL^i$ and $PL^j$ (which respectively occur at the beginning and the end of a time interval $\Delta t'$) to the receivers $Rc_n$ and $Rc_m$. More specifically, the differential phase $\Delta\Delta\theta_{mn}$ (ddphase) over the time interval $\Delta t$ should be proportional to the differential times of arrival of the pulses $PL^i$ and $PL^j$ occurring at the beginning and end of the pulses in the dwell within the time interval $\Delta t'$. More specifically, the differential phase $\Delta\Delta\theta_{mn}$ should satisfy the following relation:

$$\frac{\Delta\Delta\theta_{mn}}{\Delta t} \approx 2\pi f \frac{\Delta\Delta\tau^{ij}_{mn}}{\Delta t'} \equiv 2\pi f \frac{\Delta\tau^j_{mn} - \Delta\tau^i_{mn}}{\Delta t'} \qquad \text{Eq. 12}$$

where here f represents the frequency of the signal S. It can be shown that the relation of Eq. 12 is valid since by replacing the differential time of arrival expressed in Eq. 10 above into Eq. 12, with $\Delta t' = \Delta t$, the differential phase Eq. 7 is obtained.

In many cases, the differential phase and the differential times of arrival is measured/computed for one or more dwells of pulses (dwell is a sequence of pulses). In this case Eq. 12 above may be represented as follows $$\frac{\Delta\Delta\theta^i_{mn}}{\Delta t^i} \approx \frac{\Delta\Delta\theta^j_{mn}}{\Delta t^j} \approx \frac{2\pi f(\Delta\tau^j_{mn} - \Delta\tau^i_{mn})}{\Delta t'} \qquad \text{Eq. 13}$$

where $\Delta\Delta\theta_{mn}^i$ is the measured differential phase over the time interval $\Delta t^i$ of the first dwell i and $\Delta\Delta\theta_{mn}^j$ is the measured differential phase over the time interval $\Delta t^j$ of the second dwell j.

Thus, in operation 169, the expression of Eq. 13 above is used to set-bounds-to/estimate the possible values that the differential phase $\Delta\Delta\theta_{mn}$ can acquire. Accordingly, in some embodiments of the present invention, operation 169 is incorporated/included in 130, in which the relation of Eq. 12 is used to resolve and disambiguate the differential phase $\Delta\Delta\theta_{mn}$ calculated in 130.

This may be achieved for example by modifying the differential phase $\Delta\Delta\theta_{mn}$, expressed in Eq. 6 above, to read as follows:

$$\Delta\Delta\theta_{mn} = 2\pi/\lambda(\Delta d_m - \Delta d_n) + 2\pi Z \qquad \text{Eq. 14}$$

where Z is an integer number that is selected such that the differential phase $\Delta\Delta\theta_{mn}$ is within the boundaries given by the errors in the DTOA measurements set by Eq. 12.

In the above example the DTOA positioning technique provides for resolving possibly ambiguities in the differential phase $\Delta\Delta\theta_{mn}$. Alternatively, or additionally, information of other positioning techniques (e.g., from the differential Doppler technique) may also be used in the scope of the embodiments of the present invention for resolving this ambiguity in the differential phase $\Delta\Delta\theta_{mn}$.

Figure 3A:
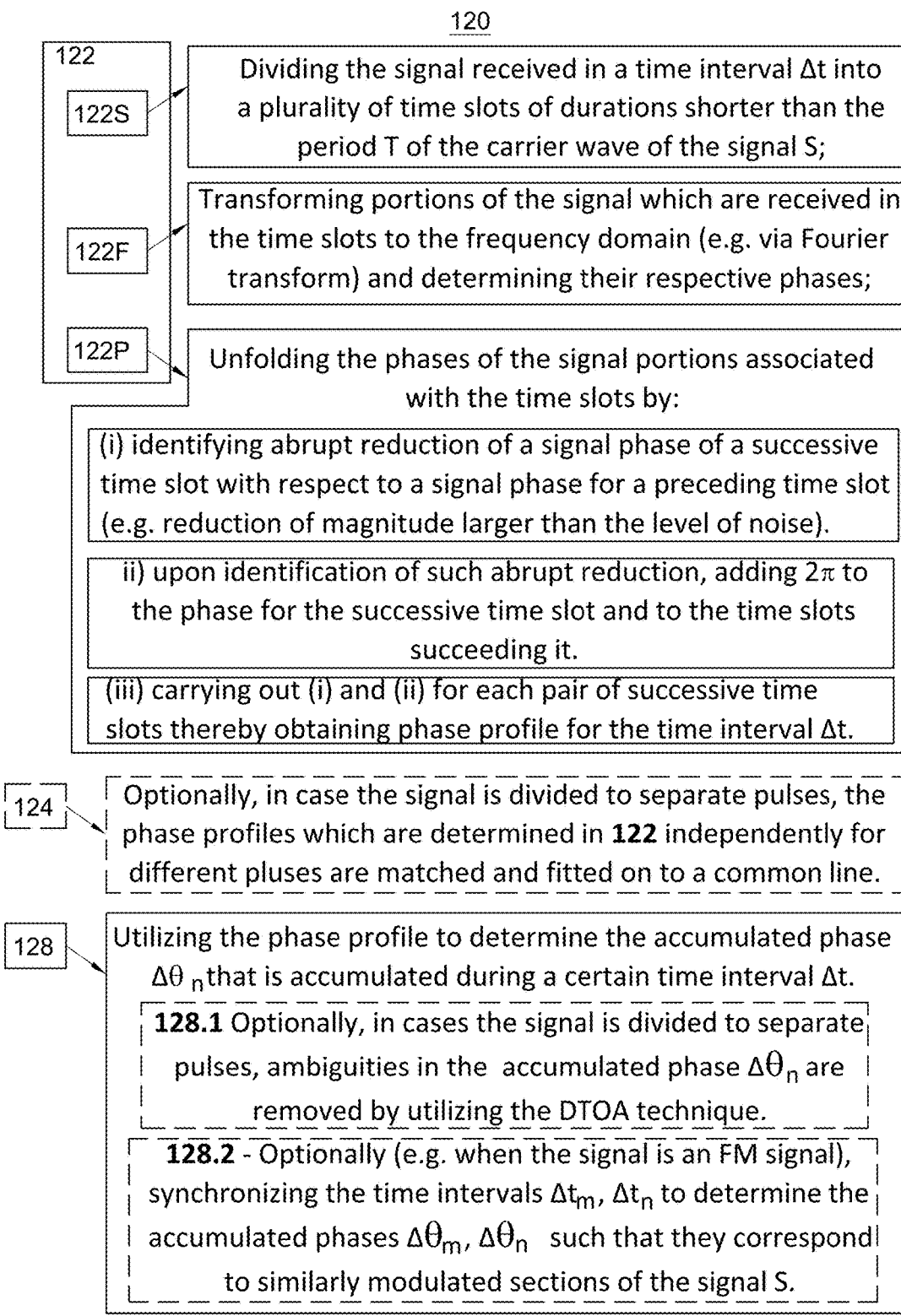
Figure 3B:
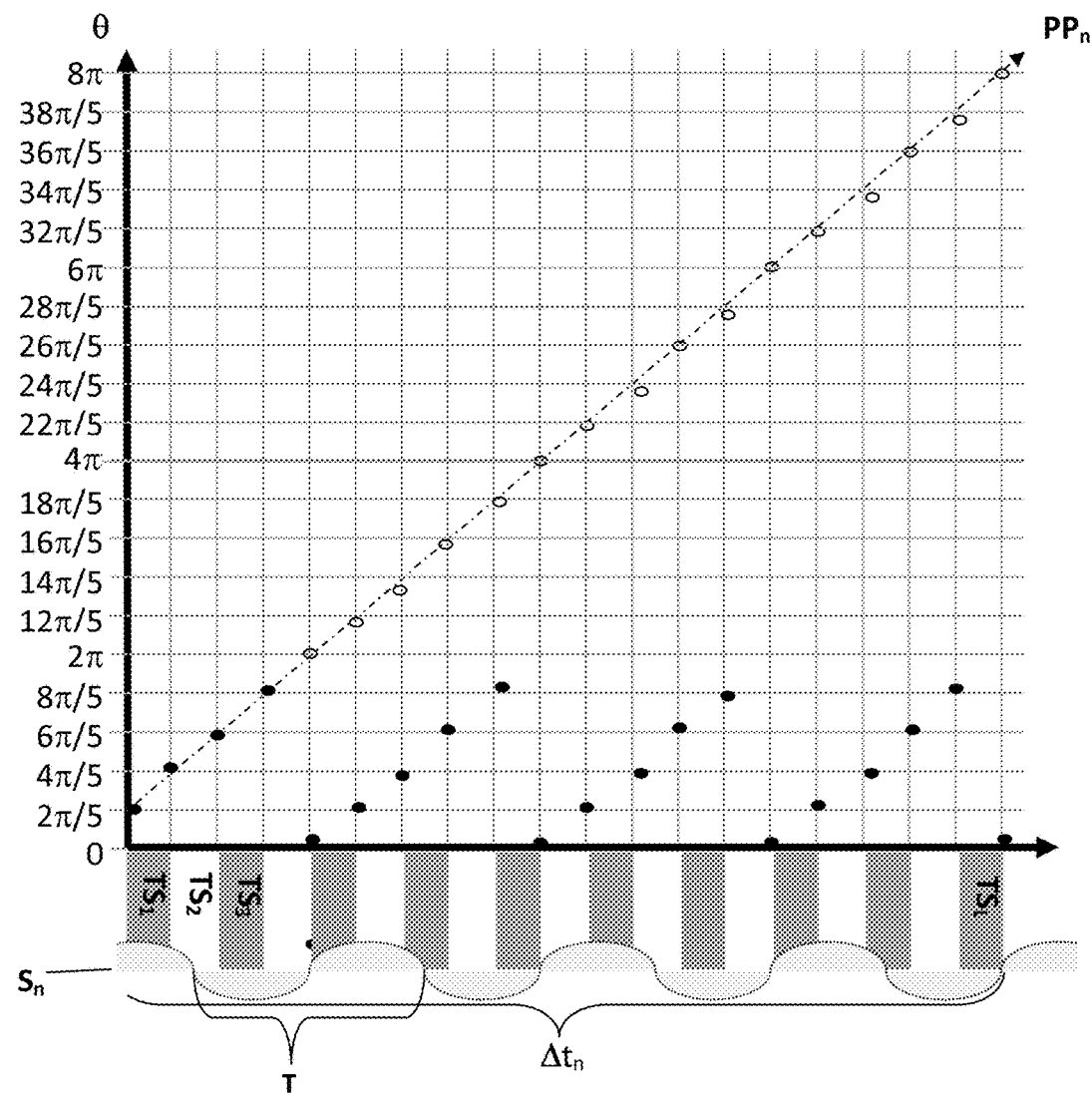
Figure 3C:
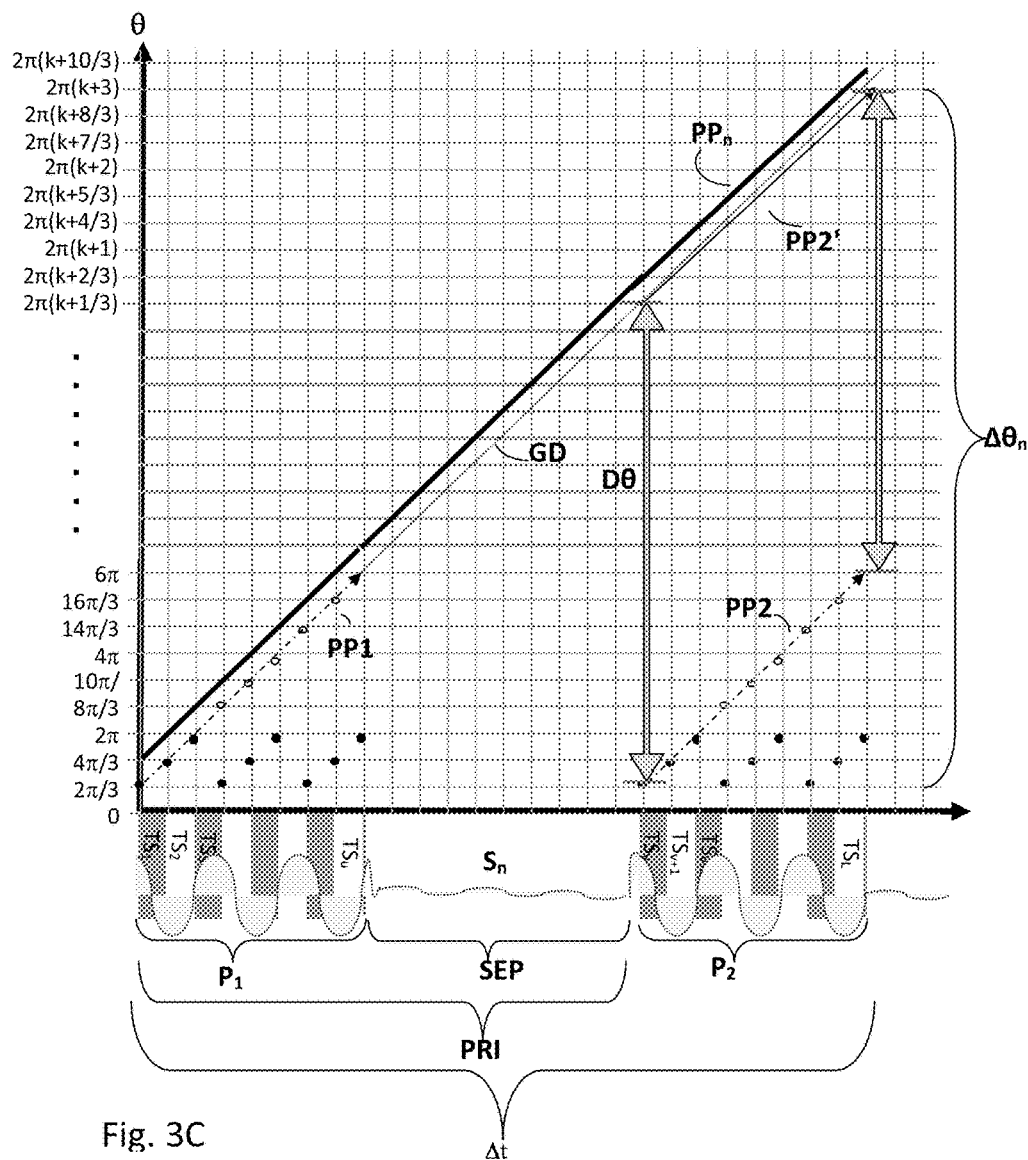

Reference is now made together to FIGS. 3A to 3C illustrating in more detail the technique according to one or more embodiments of the present invention for determining the accumulated phases $\{\Delta\theta_n\}$ accumulated by the different receivers $\{Rc_n\}$ according to various embodiments of the present invention. More specifically, this refers to determination of the accumulated phases $\{\Delta\theta_n\}$ in phase accumulation operation 120 of method 100 shown in FIG. 1A. As described in the following, the phase accumulation operation 120 may be implemented/performed, for example, by the phase accumulation system 220 shown in FIG. 1C.

FIG. 3A is a flow chart exemplifying in more detail an implementation of the phase accumulation operation 120. FIG. 3B is a graphical illustration of accumulated phases determined according to the technique of FIG. 3A. As indicated above, in order to reduce the required data to be transmitted from the receivers to a central processing center, in some cases the operation 120, or part thereof (e.g., operation 122) may be performed locally at/near each respective receiver $Rc_n$ to determine the accumulated phase $\Delta\theta_n$ of the signal received thereby during the time interval $\Delta t$. In this example, operation 120 is performed as follows on the signal S received and possibly sampled by the receiver $Rc_n$:

Operation 122 is carried out to estimate the inter-pulse accumulated phase. That is, in other words, to estimate the accumulated phase of a certain modulated section, such as a pulse, of the signal $S_n$ being received by a certain receiver $Rc_n$ Operation 122 may include sub-operations 122S, 122F, and 122P that may be implemented according to some embodiments of the present invention by modules 222S, 222F, and 222P of the inter-pulse phase accumulation module 222 of system 200.

In operation 122S, the signal $S_n$ received in a certain time interval $\Delta t$ is sampled/divided into a plurality of samples corresponding to time slots $TS_1$-$TS_L$ of durations shorter than half the period T (being one over the frequency f) of the carrier wave of the signal.

Then in operation 122F portions/samples $\{TS_L\}$ of the signal $S_n$ corresponding to the time slots are transformed into the frequency domain (e.g., via Fourier transform) and their respective phases $\{\theta_L\}$ modulus $2\pi$ are determined. The phases are therefore bounded within a range of $2\pi$ (e.g., in the range $[0, 2\pi]$ or $[-\pi, \pi]$). The phases $\{\theta_L\}$ modulus $2\pi$ of the signal portions (samples) $\{TS_L\}$ obtained in that way for a CW/pulsed signal are illustrated by the blackened points in FIG. 3B.

Operation 122P includes unfolding (unwrapping) the phases $\{\theta_L\}$, to unwrap the modular representation of the phases such that each phase $\theta_L$ will present the actual phase of the signal S accumulated from the beginning of the time interval $\Delta t$ until the time of the respective time slot $TS_L$. The unwrapped phases are illustrated by the hollow circles in FIG. 3B.

Operation 122P may be carried out by various techniques. For example in some cases sub operations (i) to (iii) are carried out as described in the following:

122P.(i) process the phases $\{\theta_L\}$ to identify abrupt reduction in the phase $\theta_{k+1}$ of a successive time slot $TS_{k+1}$ with respect to a signal phase $\theta_k$ of a time slot $TS_k$ preceding it. To this end, abrupt reduction may be considered a decrease (or increase) of more than $\pi$ in the phase value whose magnitude is larger than the level of noise associated with the receiver.

122P.(ii) upon identification of such abrupt reduction, adding multiples of $2\pi$ to the phase $\theta_{k+1}$ for the successive time $TS_{k+1}$ and also to all the phases $\theta_{k+2}$-$\theta_L$ of the time slots succeeding it; and 122P.(iii) carrying out 122P.(i) and 122P.(ii) for each pair of successive time slots.

This provides for unwrapping the phases $\{\theta_L\}$ and obtaining the phase profile PP of the signal $S_n$ during the time interval $\Delta t$, as illustrated in the dashed line in FIG. 3B. To this end it should be noted that phase profile $PP_n$ provides data indicative of the accumulated phase $\Delta\theta$ that is accumulated in the signal $S_n$ during the time interval $\Delta t$.

It should be noted that in some cases, specifically in cases where the signal $S_n$ received in the time interval $\Delta t$ is divided to separate sections/pulses, then the unfolding operation 122 may be carried out separately on each of the sections/pulses to unfold their phase, and determine the phase profile of each section/pulse separately. This is illustrated for example in FIG. 3C, showing a signal $S_n$ which includes two separate signal-sections/pulses, P1, and P2, during the time interval $\Delta t$. Here the unwrapped phase profiles PP1 and PP2 are determined independently in 122 for each of the signal-sections/pulses, P1 and P2. The signal sections may be, for example, pulses of duration in the order of micro-seconds (e.g., 1 µSec) which are transmitted with pulse repetition interval (PRI) in the order of milliseconds (e.g., 1 mSec). Accordingly, the time separation between the pulses may be in the order of the PRI.

As indicated above, the operation 122 may be implemented near/at each/some of the receivers and/or at the processing center, depending on the implementation of system 200.

In view of the above, optional operation 124, which is also referred to herein as intra-pulse phase accumulation, may be carried out in cases where phase profiles, such as PP1 and PP2, are determined independently for different sections, such as P1 and P2 of the signal $S_n$ during the time interval $\Delta t$. The purpose of optional operation 124 is to obtain data indicative of the phase profile $PP_n$ of the signal $S_n$ during the entire time interval $\Delta t$, from which the accumulated phase $\Delta\theta$ during the time interval $\Delta t$ can be determined/estimated. In 124 the phase profile $PP_n$ for the entire time interval $\Delta t$ is obtained by fitting the phase profile PP1 and PP2 onto a common line. As indicated above, this may be performed at the processing center. For example, the phase profile PP1 of the first pulse/modulated-section P1 of the received signal $S_n$ is used to construct the guideline GD illustrated in the figure FIG. 3C. The phase profile PP2 of the second pulse/modulated-section P2 of the received signal $S_n$ is fitted/matched to the guideline GD by adding thereto a certain phase value $D\theta$, which is an integral multiple of $2\pi$, selected in accordance with the time separation SEP between the pulses, which may be for example estimated from the derivative of the phase profile(s) PP1 and/or PP2. The fitted phase profile PP2 is illustrated in the figure and indicated by PP2'. Accordingly, the phase profile PP for the entire time interval $\Delta t$ is estimated.

In operation 128 the phase profile PP is used to determine the accumulated phase $\Delta\theta_n$ that is accumulated during the time interval $\Delta t$.

It should be however noted that in cases where operation 124 is conducted, some ambiguity might be introduced in the thus determined accumulated phase $\Delta\theta_n$. This is because the added phase value $D\theta$ which is used to match and fit the phase profile(s) may be ambiguous and may actually supplement $2\pi k$ value to the accumulated phase where k is any integer value (positive, negative, or zero). To this end, in optional operation 128.1, the ambiguity is optionally removed by utilizing the DTOA technique as described above with reference to Eq. 13. Alternatively, or in addition to Eq. 13, the ambiguity in the differential phase $\Delta\Delta\theta_{mn}$ may be also reduced by other techniques (e.g., by using additional positioning techniques other than the DTOA). More specifically, the ambiguity in the accumulated phase $\Delta\theta_n$ is manifested in an ambiguity in the differential phase $\Delta\Delta\theta_{mn}$, which is computed in operation 130 of method 100. Thus, by utilizing additional positioning techniques, such as DTOA (see Eq. 12 above) and/or other additional positioning techniques, this ambiguity can be resolved.

It should be noted that in certain cases, for instance when the signal S is an FM signal, the time intervals $\Delta t_m$, $\Delta t_n$ should be synchronized in order for the accumulated phases $\Delta\theta_m$, $\Delta\theta_n$ to correspond to the same section of the signal and/or to two similarly modulated sections of the signal S. In such cases, optional operation 128.2 may be carried out for synchronizing the time intervals $\Delta t_m$ and $\Delta t_n$ (e.g., utilizing cross-correlation between the signals received by the different receivers), so that the time intervals $\Delta t_m$ and $\Delta t_n$ correspond to the times of receipt of similarly modulated signal sections by the respective receivers.

The invention claimed is:

1. A method for locating a signal source, the method comprising:

providing measured data indicative of a signal $S_n$ received from a signal source by each of a number of at least two receivers $\{Rc_n\}$ during time intervals $\{\Delta t_n\}$, where n is an index indicating the $n^{th}$ receiver $Rc_n$, and providing position data indicative of positions $\{R_n\}$ of said at least two receivers and of change $\{\Delta R_n\}$ in said positions $\{R_n\}$ during said time intervals $\{\Delta t_n\}$ respectively;

applying first processing to each of the signal $S_n$ to determine an accumulated phase $\Delta\theta_n$ that is accumulated during the time interval $\Delta t_n$ during which the signal $S_n$ is received by the respective receiver $Rc_n$ and thereby determining accumulated phases $\{\Delta\theta_n\}$ of signals $\{S_n\}$ received from said signal source by said receivers $\{Rc_n\}$ respectively;

applying second processing to determine differential phase differences $\Delta\Delta\theta_{mn}=(\Delta\theta_m-\Delta\theta_n)$ between the accumulated phases, $\Delta\theta_m$ and $\Delta\theta_n$, of the signals, $S_m$ and $S_n$, received by two or more pairs $\{m,n\}$ of the receivers, $Rc_m$ and $Rc_n$; wherein a differential phase difference $\Delta\Delta\theta_{mn}$, between a pair of the receivers $Rc_m$ and $Rc_n$, is indicative of a distance difference $\Delta D_{mn}$ between the changes, $\Delta d_m$ and $\Delta d_n$, in the distances, $d_m$ and $d_n$, of the respective receivers $Rc_m$ and $Rc_n$ from said signal source during the time intervals $\Delta t_m$ and $\Delta t_n$ respectively; and applying a third processing to determine a location of said signal source based on said position data and the differential phase differences $\{\Delta\Delta\theta_{mn}\}$ of the two or more pairs $\{m,n\}$ of receivers such that said location of the signal source satisfies the distance differences $\{\Delta D_{mn}\}$ between the two or more pairs $\{m,n\}$ of said receivers.

2. The method of claim 1 wherein said first processing for determining said accumulated phase $\Delta\theta_n$ comprises determining a difference between a phase $\theta_n(t_0+\Delta t_n)$ of the signal $S_n$ at an end of said time interval $\Delta t_n$ and a phase $\theta_n(t_0)$ of said signal at a beginning of said time interval $\Delta t_n$.

3. The method of claim 2 wherein said first processing of the signal $S_n$ received by receiver $Rc_n$ comprises unwrapping the phase of said signal $S_n$ by carrying out the following:

(i) dividing the signal $S_n$ received in said time interval $\Delta t_n$ into a plurality of time slots of durations shorter than the period T;

(ii) applying Fourier transform to signal portions of the signal $S_n$ in each of said time slots to respectively determine signal phases of said signal portions modulus $2\pi$;

(iii) processing said signal phases of said time slots to identify abrupt change of a signal phase of a successive time slot with respect to a signal phase of time slot preceding it, wherein a magnitude of said abrupt change satisfies the following: it is substantially larger than a noise level associated with said receiver $Rc_n$ and it is larger than $\pi$;

(iv) adding multiples of $2\pi$ to the signal phase for said successive time slot and to signal phases of each of the time slots succeeding it; and (v) repeating (iii) and (iv) for each pair of successive time slots.

4. The method of claim 1 wherein said respective time intervals $\{\Delta t_n\}$ are of equal durations.

5. The method of claim 1 wherein said signal $S_n$ comprises continuous-wave (CW) signal components.

6. The method of claim 1 wherein said signal source is a stationary signal source emitting a CW signal and wherein the method enables determining the location of said signal source by utilizing a number of receivers that is at least the number of dimensions, with respect to which said location of said signal source should be determined, plus one.

7. The method of claim 1 wherein said signal $S_n$ comprises signal sections modulated by at least one modulation pattern; and wherein the method further comprising identifying receipt timings of said signal sections by said receivers and processing said receipt timings wherein said processing is carried out for at least one of the following:

removing ambiguities in determination of said differential phase differences $\Delta\Delta\theta_{mn}$;

utilizing differential time of arrival (DTOA) to determine the location of the signal source thereby reducing the number of receivers required for identifying the location of the signal source.

8. The method of claim 7 wherein a position of said signal source is assumed static and wherein said number of receivers is at least the number of dimensions, with respect to which said location of said signal source should be determined.

9. The method of claim 7 wherein said first processing comprises identifying similarly modulated sections in the signals $S_n$ and $S_m$ received by a pair $Rc_m$, $Rc_n$ of said receivers selecting the timings of the time intervals $\Delta t_n$, $\Delta t_m$ of the pair $Rc_m$, $Rc_n$ during which to determine said accumulated phases $\Delta\theta_n$ and $\Delta\theta_m$, in accordance with receipt timings of said similarly modulated sections.

10. The method of claim 9 wherein said signal is frequency modulated thereby yielding the phase $\theta_n(t)$ of the signal $S_n$ being a non-linear function of time, and wherein the method includes identifying matching modulation patterns in the signals $S_n$ and $S_m$, determining a common reference point in the signals $S_n$ and $S_m$, and setting said timing of the time intervals $\Delta t_n$, $\Delta t_m$ of the corresponding receivers $Rc_n$, $Rc_m$ relative to said common reference point in their respective signals $S_n$ and $S_m$.

11. The method of claim 10 wherein the signal transmitted from said signal source includes multiple repetitions of said at least one modulation pattern and wherein said common reference point is determined relative to same or different sections of said signal, which are modulated by said modulation pattern, received by said $Rc_n$, $Rc_m$ thereby obviating a need to perform time synchronization in between said receivers $Rc_n$, $Rc_m$.

12. The method of claim 9, further comprising performing time synchronization between said receivers $Rc_n$, $Rc_m$ and utilizing said time synchronization to identify said similarly modulated sections.

13. The method of claim 12 wherein said time synchronization is performed by processing data indicative of the signals $S_n$ and $S_m$ received by said receivers to determine a time delay associated with a best-fit between them and synchronizing the timings of said $Rc_n$, $Rc_m$ based on said time delay.

14. The method of claim 1 wherein said signal is a pulsed signal, and wherein the method further comprises identifying receipt timings of pulses of said signals by different receivers and further utilizing differential time of arrival to determine said location of the signal source thereby reducing the number of receivers required for identifying the location of the signal source.

15. A system for locating a signal source, emitting a signal S the system comprising:
- one or more phase accumulation modules adapted to obtain information indicative of the signals $\{S_n\}$ corresponding to said signal received by a number of at least two receivers $\{Rc_n\}$, indexed n, during time intervals $\{\Delta t_n\}$, and apply a first processing to each signal $S_n$ to determine an accumulated phase $\Delta\theta_n$ that is accumulated during the respective time interval $\Delta t_n$, during which the signal $S_n$ is received by the respective receiver $Rc_n$; thereby determining accumulated phases $\{\Delta\theta_n\}$ of signals $\{S_n\}$ received from said signal source by said receivers $\{Rc_n\}$ respectively;
- a differential phase processor adapted to apply second processing to the accumulated phases $\{\Delta\theta_n\}$ to determine differential phase differences $\Delta\Delta\theta_{mn}=(\Delta\theta_m-\Delta\theta_n)$ between the accumulated phases, $\Delta\theta_m$ and $\Delta\theta_n$, of the signals, $S_m$ and $S_n$, received by two or more pairs $\{m,n\}$ of the receivers, $Rc_m$ and $Rc_n$, such that a differential phase difference $\Delta\Delta\theta_{mn}$ between a pair of the receivers, $Rc_m$ and $Rc_n$, is indicative of a distance difference $\Delta D_{mn}$ between the changes, $\Delta d_m$ and $\Delta d_n$, in the distances, $d_m$ and $d_n$, of the respective receivers $Rc_m$ and $Rc_n$ from said signal source during the respective time intervals $\Delta t_m$ and $\Delta t_n$; and
- a source location processor adapted to apply a third processing to the differential phase differences $\{\Delta\Delta\theta_{mn}\}$ of the two or more pairs $\{m,n\}$ of receivers based on position data indicative of positions $\{R_n\}$ of said at least two receivers and of change $\{\Delta R_n\}$ in said positions $\{R_n\}$ during said time intervals $\{\Delta t_n\}$ respectively, and determine a location of said signal source, such that the determined location of the signal source satisfies that the differences between the changes, $\Delta d_n$ and $\Delta d_m$, of the distances, $d_n$ and $d_m$, between the signal sources and the respective receivers, $Rc_n$ and $Rc_m$, during the respective time intervals, $\Delta t_n$ and $\Delta t_m$, correspond to said distance differences $\{\Delta D_{mn}\}$ associated with said differential phase differences $\{\Delta\Delta\theta_{mn}\}$.

16. The system of claim 15 wherein the phase accumulation modules are adapted for performing said first processing to determine the accumulated phase $\Delta\theta_n$, by determining a difference between a phase $\theta_n(t_0+\Delta t_n)$ of the signal $S_n$ at an end of said time interval $\Delta t_n$ and a phase $\theta_n(t_0)$ of said signal at a beginning of said time interval $\Delta t_n$.

17. The system of claim 15 wherein the phase accumulation modules are adapted to unwrap the phase of said signal $S_n$ by carrying out the following:

(i) segmenting the signal $S_n$ received in said time interval $\Delta t_n$ into a plurality of time slots of durations shorter than the period T;
(ii) applying Fourier transform to signal portions of the signal $S_n$ in each of said time slots to respectively determine signal phases of said signal portions modulus $2\pi$;
(iii) processing said signal phases of said time slots to identify abrupt change of a signal phase of a successive time slot with respect to a signal phase of time slot preceding it, wherein a magnitude of said abrupt change satisfies the following: it is substantially larger than a noise level associated with said receiver $Rc_n$ and it is larger than $\pi$;
(iv) adding multiples of $2\pi$ to the signal phase for said successive time slot and to signal phases of each of the time slots succeeding it; and
(v) repeating (iii) and (iv) for each pair of successive time slots.

18. The system of claim 15 configured and operable to determine the location of said signal source wherein said signal source is a stationary signal source emitting a CW signal; and wherein said one or more phase accumulation modules are adapted to obtain information indicative of the signals $\{S_n\}$ corresponding to said signal received from the signal source by a number of receivers $\{Rc_n\}$ that is at least the number of dimensions, with respect to which said location of said signal source should be determined, plus one.

19. The system of claim 15 wherein said signal $S_n$ comprises signal sections modulated by at least one modulation pattern; the system comprises a time of arrival (TOA) module adapted to identify receipt timings of similarly modulated sections of the received signals to avoid ambiguities in determination of said differential phase differences $\Delta\Delta\theta_{mn}$.

20. The system of claim 19, further comprising a multi-lateration module configured and operable for processing the receipt timings of said signal sections by said receivers to determine DTOA data indicative of a differential time of arrival (DTOA) of the similarly modulated sections of the signal to the different receivers, and thereby reducing the number of receivers required for determining the location of the signal source based on both the differential phase $\Delta\Delta\theta_{mn}$ and the DTOA data.

* * * * *